US010144442B2

(12) United States Patent
Ransil

(10) Patent No.: US 10,144,442 B2
(45) Date of Patent: Dec. 4, 2018

(54) TRAVEL STROLLER FOLDING AND LATCH MECHANISM

(71) Applicant: ARTSANA USA, INC., Lancaster, PA (US)

(72) Inventor: Matthew J. Ransil, Richland, PA (US)

(*) Notice: Subject to any disclaimer, the term of this patent is extended or adjusted under 35 U.S.C. 154(b) by 0 days.

(21) Appl. No.: 15/878,451

(22) Filed: Jan. 24, 2018

(65) Prior Publication Data

US 2018/0148082 A1 May 31, 2018

Related U.S. Application Data

(63) Continuation of application No. 15/255,610, filed on Sep. 2, 2016, now Pat. No. 9,908,551.

(51) Int. Cl.
*B62B 7/06* (2006.01)
*B62B 7/08* (2006.01)
*B62B 9/10* (2006.01)

(52) U.S. Cl.
CPC ............... *B62B 7/062* (2013.01); *B62B 7/08* (2013.01); *B62B 9/102* (2013.01); *B62B 7/064* (2013.01); *B62B 2205/20* (2013.01)

(58) Field of Classification Search
CPC .............. B62B 7/06; B62B 7/062; B62B 7/10
USPC ........................................ 280/642, 647, 650
See application file for complete search history.

(56) References Cited

U.S. PATENT DOCUMENTS

| 4,834,403 | A | 5/1989 | Yanus et al. | |
|---|---|---|---|---|
| 4,872,692 | A | 10/1989 | Steenburg | |
| 5,511,441 | A * | 4/1996 | Arai | B62B 7/08 280/47.38 |
| 5,845,925 | A | 12/1998 | Huang | |
| 6,095,548 | A * | 8/2000 | Baechler | B62B 7/062 280/642 |
| 6,105,998 | A * | 8/2000 | Baechler | B62B 7/062 280/47.38 |
| 6,196,571 | B1 * | 3/2001 | Chen | B62B 7/08 280/647 |
| 6,422,587 | B1 * | 7/2002 | Yamazaki | B62B 7/06 280/42 |
| 6,485,216 | B1 * | 11/2002 | Cheng | B62B 7/06 280/47.36 |
| 6,581,957 | B1 | 6/2003 | Lan | |
| 7,070,197 | B2 | 7/2006 | Chen | |

(Continued)

FOREIGN PATENT DOCUMENTS

GB 2489330 B 10/2013
WO 2013149641 A1 10/2013

*Primary Examiner* — Jeffrey J Restifo
(74) *Attorney, Agent, or Firm* — Patent Law Associates

(57) ABSTRACT

A stroller frame having forwardly extending right and left side front supports, rearwardly extending right and left side rear supports, and upwardly extending right and left side handle supports moveable connected to permit movement of the frame between deployed and collapsed orientations, and a downwardly folding seat frame connected to the front and rear supports having right and left side fold mechanisms which are configured to lock the frame in the deployed configuration, apply a biasing force to fully deploy the seat frame during the unfolding movement, and isolate the biasing force while applying a folding force to the seat frame during the folding operation, actuation of the fold mechanisms based on frame orientation and position of a release handle.

12 Claims, 22 Drawing Sheets

(56) References Cited

U.S. PATENT DOCUMENTS

| | | | |
|---|---|---|---|
| 7,077,420 B1* | 7/2006 | Santoski | B62B 7/062 280/639 |
| 7,632,035 B2* | 12/2009 | Cheng | B62B 7/008 280/642 |
| 7,780,183 B2 | 8/2010 | Chen et al. | |
| 7,871,100 B2 | 1/2011 | Chen et al. | |
| 8,205,907 B2* | 6/2012 | Chicca | B62B 7/062 280/642 |
| 8,226,110 B2* | 7/2012 | Liao | B62B 7/062 280/47.38 |
| 8,322,744 B2* | 12/2012 | Ahnert | B62B 9/20 280/47.4 |
| 8,419,025 B2 | 4/2013 | Chen et al. | |
| 8,444,170 B2 | 5/2013 | Chen et al. | |
| 8,485,546 B2* | 7/2013 | Li | B62B 7/08 280/642 |
| 8,544,857 B2 | 10/2013 | Schnarr et al. | |
| 8,622,404 B2* | 1/2014 | Chen | B62B 9/203 280/47.36 |
| 8,714,581 B2* | 5/2014 | Fritz | B62B 7/08 280/642 |
| 8,870,213 B1* | 10/2014 | Xu | B62B 7/08 280/642 |
| 8,905,428 B2 | 12/2014 | Schroeder et al. | |
| 8,919,806 B2 | 12/2014 | Pollack et al. | |
| 8,936,267 B2 | 1/2015 | Li et al. | |
| 8,961,057 B2* | 2/2015 | Schroeder | F16C 11/10 280/647 |
| 8,985,616 B1 | 3/2015 | Chen | |
| 8,979,114 B2 | 5/2015 | Cheng et al. | |
| 9,050,989 B2 | 6/2015 | Fleming et al. | |
| 9,193,373 B2* | 11/2015 | Fjelland | B62B 7/08 |
| 9,308,929 B1* | 4/2016 | Dowd | B62B 7/062 |
| 9,580,098 B2* | 2/2017 | Eisinger | B62B 7/06 |
| 9,604,659 B1* | 3/2017 | Wang | B62B 7/10 |
| 9,796,405 B2* | 10/2017 | Li | B62B 7/062 |
| 2002/0121766 A1* | 9/2002 | Suzuki | B62B 7/08 280/647 |
| 2003/0057680 A1* | 3/2003 | Lan | B62B 7/08 280/642 |
| 2006/0125210 A1* | 6/2006 | Fox | B62B 7/08 280/642 |
| 2006/0273552 A1* | 12/2006 | Lan | B62B 7/10 280/642 |
| 2006/0273553 A1* | 12/2006 | Lan | B62B 7/10 280/642 |
| 2007/0069504 A1* | 3/2007 | Lan | B62B 7/10 280/642 |
| 2010/0127480 A1* | 5/2010 | Ahnert | B62B 7/08 280/647 |
| 2011/0181024 A1* | 7/2011 | Chicca | B62B 7/062 280/642 |
| 2012/0242062 A1* | 9/2012 | Schroeder | B62B 7/08 280/650 |
| 2013/0140797 A1* | 6/2013 | Fritz | B62B 7/08 280/649 |
| 2013/0147162 A1* | 6/2013 | Hsu | B62B 7/062 280/647 |
| 2014/0167393 A1 | 6/2014 | Tsai et al. | |
| 2015/0159414 A1 | 6/2015 | Sukeforth et al. | |
| 2015/0197268 A1* | 7/2015 | Dowd | B62B 7/08 280/650 |
| 2015/0291200 A1* | 10/2015 | Taylor | B62B 7/10 280/642 |
| 2017/0057533 A1* | 3/2017 | Ransil | B62B 7/08 |
| 2017/0144687 A1* | 5/2017 | Li | B62B 7/062 |
| 2017/0267272 A1* | 9/2017 | Gao | B62B 7/062 |
| 2017/0297600 A1* | 10/2017 | Zhong | B62B 7/083 |
| 2017/0313337 A1* | 11/2017 | Horst | B62B 7/044 |
| 2018/0065654 A1* | 3/2018 | Chen | B62B 7/062 |

* cited by examiner

TRAVEL STROLLER FOLDING AND LATCH MECHANISM

CROSS-REFERENCE TO RELATED APPLICATIONS

This application is a continuation of U.S. patent application Ser. No. 15/255,610 filed on Sep. 2, 2016.

BACKGROUND OF THE INVENTION

The present application relates generally to the field of child strollers. More particularly, the present invention relates to a foldable stroller that includes a folding and latching mechanism having biasing means that increases the ease with which the stroller may be deployed for use and folded for stowage.

Even though foldable strollers have been in production for quite some time, efforts to improve the ease with which they may be folded for stowage and increase the compactness of the folded stroller constantly continue. Mechanisms to coordinate folding movement of the legs and handle extensions as the stroller is folded and easily-releasable latches allowing the folding operation to commence have dramatically improved the ease of use over the years. One area of focus has been in mechanisms that allow the stroller to be collapsed for stowage that require only one hand to operate. Another area of focus involves optimizing stroller frame configuration, especially swivel wheel position, so that a folded stroller frame is as compact as is possible and preferable capable of stably standing when folded.

There is a need for a foldable stroller that can be folded using a simple, one-handed operation which releases the latch, folds the stroller frame in a coordinated manner, and positions swivel wheels for maximum compactness while allowing the folder stroller to stand upright in the folded condition.

SUMMARY OF THE INVENTION

Accordingly, the present invention, in any of the embodiments described herein, may provide one or more of the following advantages:

According to one embodiment of the present invention, a stroller having forwardly extending right and left side front wheel supports with at least one forwardly disposed wheel connector, rearwardly extending right and left side rear wheel supports with rearwardly disposed wheel connectors, and upwardly extending right and left side handle supports terminating in one or more handles at the upper end are interconnected by right and left side fold mechanisms to form a collapsible frame. The folding mechanisms allow movement of respective front wheel supports, rear wheel supports, and handle supports as the stroller frame is moved between collapsed and deployed positions and provides a latching mechanism to maintain the frame in at least the deployed position until selectively released. An articulated seat frame connects the front and rear wheel supports and coordinates folding movement of the wheel and handle supports. The articulated seat frame includes a transverse pivot intermediately disposed between the front and rear support connections. The pivot is configured to displace downwardly as the stroller frame is folded in order to position the seating elements attached to the seat frame away from the folding joints and improve folding space efficiency. The latching mechanism further includes a biasing mechanism that is selectively applied based on frame and latch release mechanism position to urge the seat frame into a fully deployed position.

Another embodiment of the present invention provides a stroller having forwardly extending right and left side front wheel supports with at least one forwardly disposed wheel connector, rearwardly extending right and left side rear wheel supports with rearwardly disposed wheel connectors, and upwardly extending right and left side handle supports terminating in one or more handles at the upper end. Left and right side folding mechanisms are provided at the forward end of the rear wheel supports. The front wheel and handle supports are each pivotally connected to respective folding mechanisms to form a collapsible frame. An articulated seat frame having right and left-hand sides connects the respective front and rear wheel supports and coordinates folding movement of the wheel and handle supports. The articulated seat frame includes a transverse pivot intermediately disposed between the front and rear support connections. A latching mechanism is provided in the articulated seat frame that allows the stroller to be selectively restrained in a deployed configuration. A releasing mechanism operates the latching mechanism to release the latch and allow the stroller to be folded. The releasing mechanism may be configured to provide a convenient means for carrying by hand the folded stroller.

In another aspect of the invention, the frame may include positioning elements that bias the stroller frame toward predefined positions, such as the folded or deployed positions. Folding mechanisms are provided to work with the articulated seat frame to lock the frame in a deployed for use configuration. Movement from the deployed configuration requires selective operation by a user of a latching release to enable the frame to move. Once released, the folding mechanism may include provisions to urge the frame toward a desired second position, such as the folded position, and retain the frame in that configuration until the user takes steps to deploy the stroller for use. A spring-load latching element interacting with the cam in the folding mechanism, the cam having one or more detents, initiates folding movement of some frame members to ease the folding of the articulated seat frame.

Another aspect of the invention is to provide an articulated seat frame having additional biasing mechanisms to assure that the pivoting joints in the articulation mechanism are biased to move in the desired directions during folding and unfolding of the stroller frame to avoid binding or locking of the mechanism. A latching mechanism which includes a torsional spring to assist in rotation of the frame during the unfolding motion and a blocking link to prevent the torsional spring from rotating the frame during the initiation of folding motions enables the articulated seat frame to include pivot joints aligned to provide maximum utility and space savings without concern for potential over-center or near-over-center pivot alignments.

It is a still further object of the present invention to provide a foldable frame having a release handle operably connected to a latching mechanism wherein the latching mechanism is configured to bias movement of select frame members based on frame and release handle orientations that is durable in construction, inexpensive of manufacture, carefree of maintenance, easily assembled, and simple and effective to use.

These and other objects are achieved in accordance with the present invention by providing a stroller frame having forwardly extending right and left side front supports, rearwardly extending right and left side rear supports, and upwardly extending right and left side handle supports moveable connected to permit movement of the frame between deployed and collapsed orientations, and a downwardly folding seat frame connected to the front and rear supports having right and left side fold mechanisms which are configured to lock the frame in the deployed configuration, apply a biasing force to fully deploy the seat frame during the unfolding movement, and isolate the biasing force while applying a folding force to the seat frame during the folding operation, actuation of the fold mechanisms based on frame orientation and position of a release handle.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
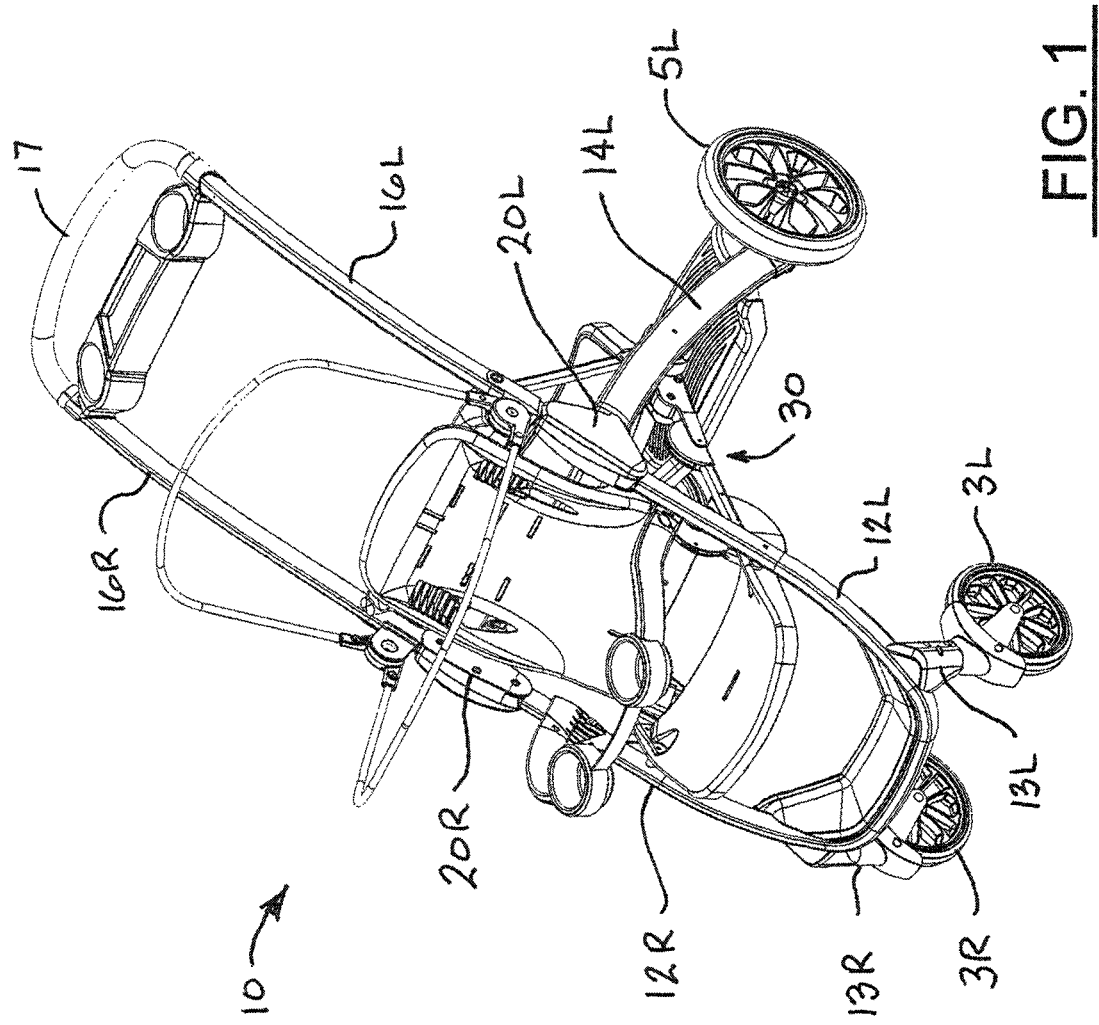
FIG. 1 is a perspective view of a folding stroller frame embodying aspects of the present invention.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined as the stroller would normally be pushed by a user across the floor or a similarly level surface while in an operating position. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

When referring to the figures, like parts are numbered the same in all of the figures. Inclusion of an "R" or an "L" designation in conjunction with a reference number signifies an item shown on the right or left side of the stroller, respectively. Use of the reference number sans "R" or an "L" designation refers to the item generically without regard to a particular orientation.

Referring to FIGS. 1 through 4, a foldable stroller frame 10 is shown comprising forwardly extending right and left side front wheel supports 12R, 12L with at least one forwardly disposed wheel connector 13R, 13L, rearwardly extending right and left side rear wheel supports 14R, 14L with rearwardly disposed wheel connectors 15R, 15L, and upwardly extending right and left side handle supports 16R, 16L terminating in one or more handles 17 at the upper end are interconnected by right and left side folding joints 20R, 20L to form the main portion of the collapsible stroller frame. The folding joints 20R, 20L enable pivoting movement of respective front wheel supports 12, rear wheel supports 14, and handle supports 16 so that the stroller frame 10 may be moved between the collapsed position (see FIG. 4) and the deployed position shown in FIGS. 1 and 2. Relative movement of the frame members during the collapsing operation is indicated by rotational arrows "A" in FIG. 3.

Frame 10 may be supported by one or more front wheels 3R, 3L and a pair of transversely spaced-apart rear wheels 5R, 5L. Additional combinations of wheels such as a single front wheel or swivel-mounted wheels on the rear wheel supports may also be utilized.

Referring now to FIGS. 2 through 7, the frame 10 further includes an articulated seat frame 30 comprising right and left side forward portions 32 and right and left side rearward portions 34 connected at their proximal ends 321, 341 by pivot connectors 35 which enable finite pivoting movement between the forward and rearward portions about first pivot axis 110. The distal ends 322 of the forward portions 32 are pivotally connected to the front wheel supports 12 and configured for pivoting movement about forward axis 130. The distal ends 342 of the rearward portions 34 are pivotally connected to the rear wheel supports 14 and configured for movement about rearward axis 120.

Figure 4:
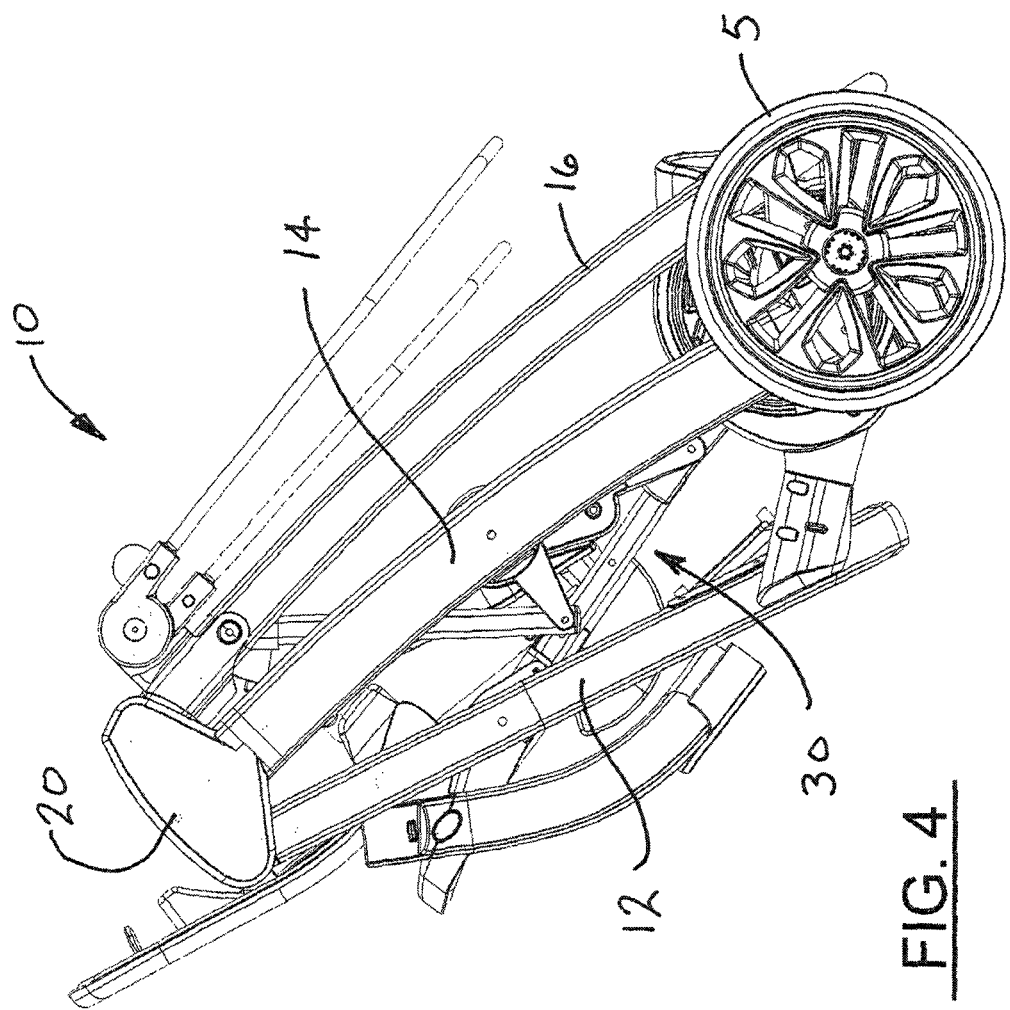
FIG. 4 is a side view of one of the folding stroller frame of FIG. 1 shown in a fully folded configuration.
Figure 5:
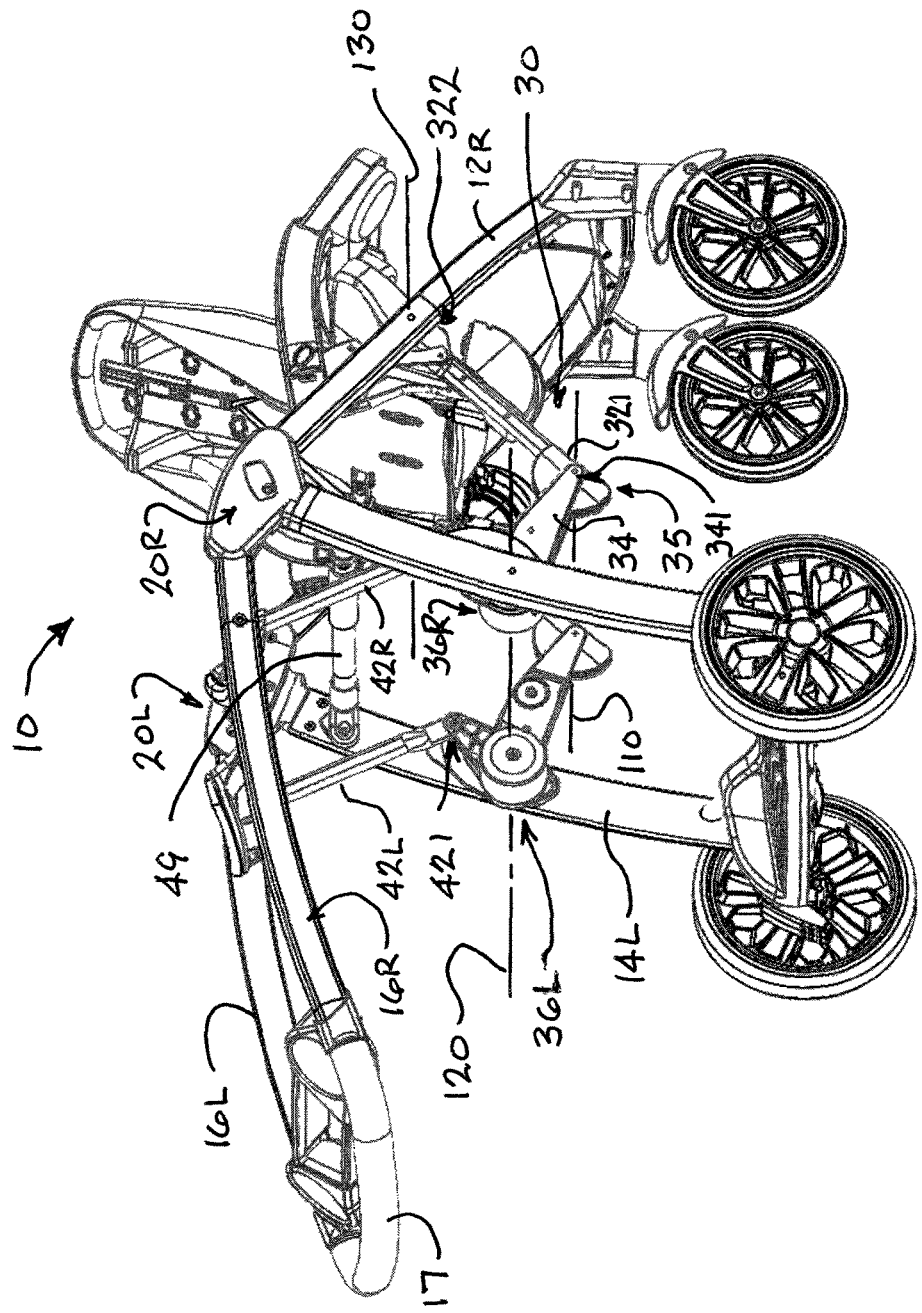
FIGS. 5 through 7 are partial perspective views of the stroller frame, shown partially folded and highlighting the articulated seat support folding mechanism.
Figure 6:
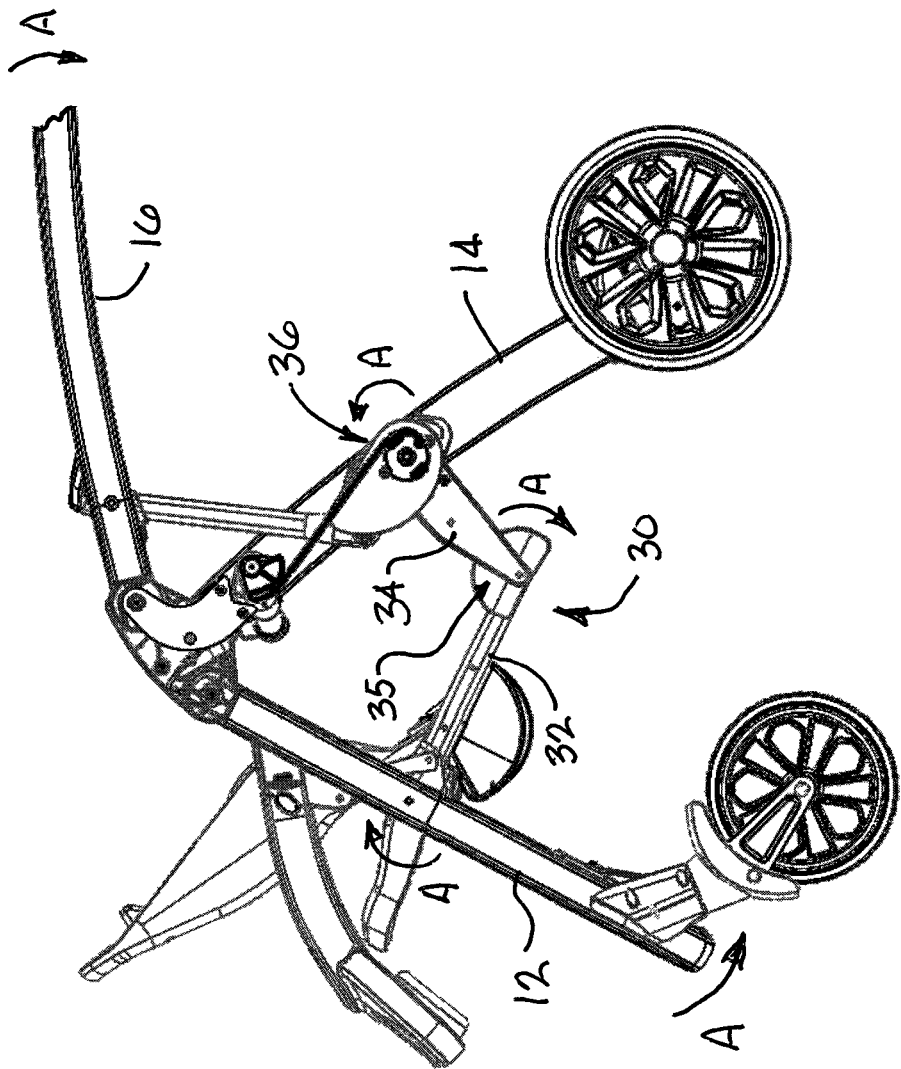
Figure 7:
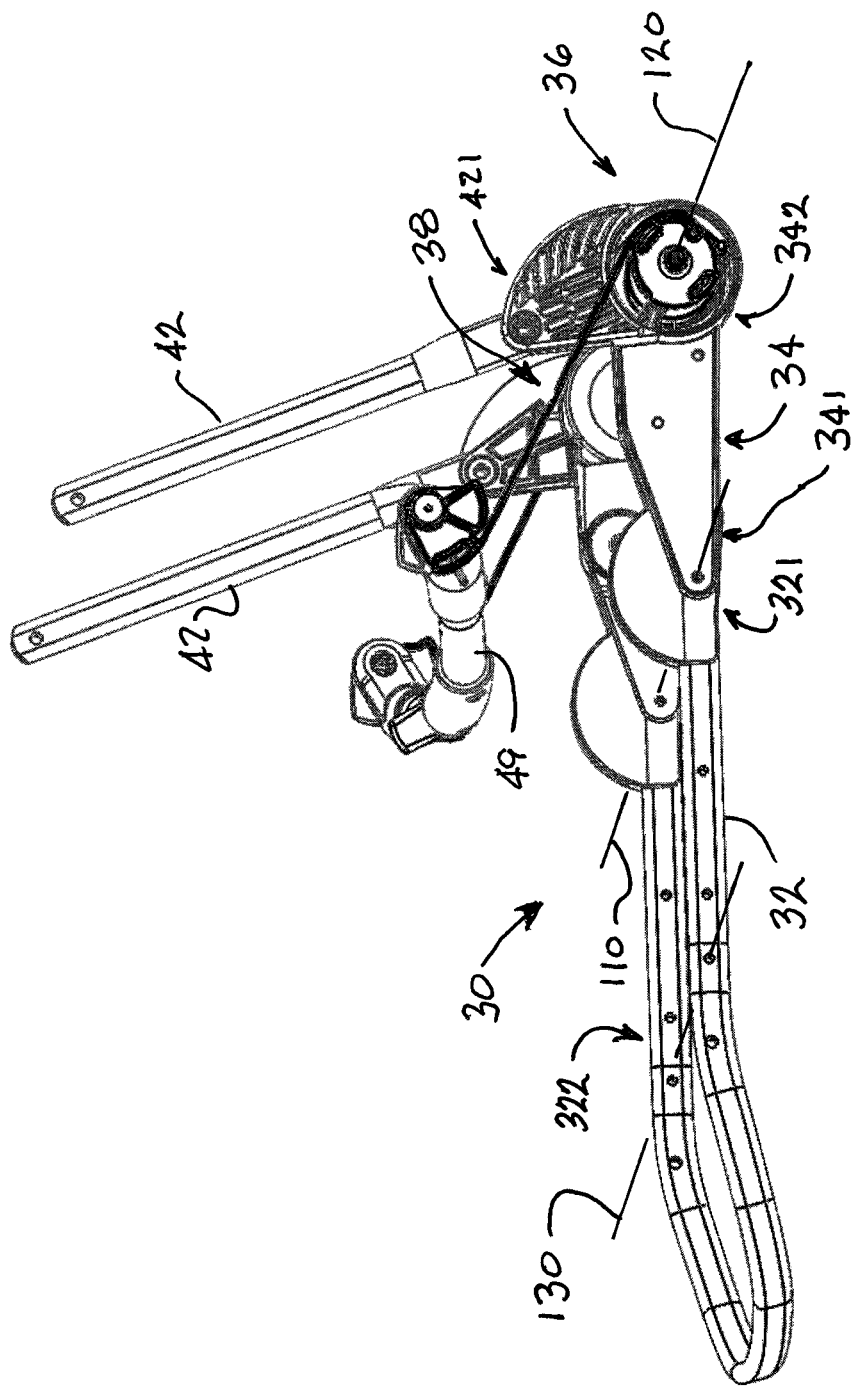
Figure 8:
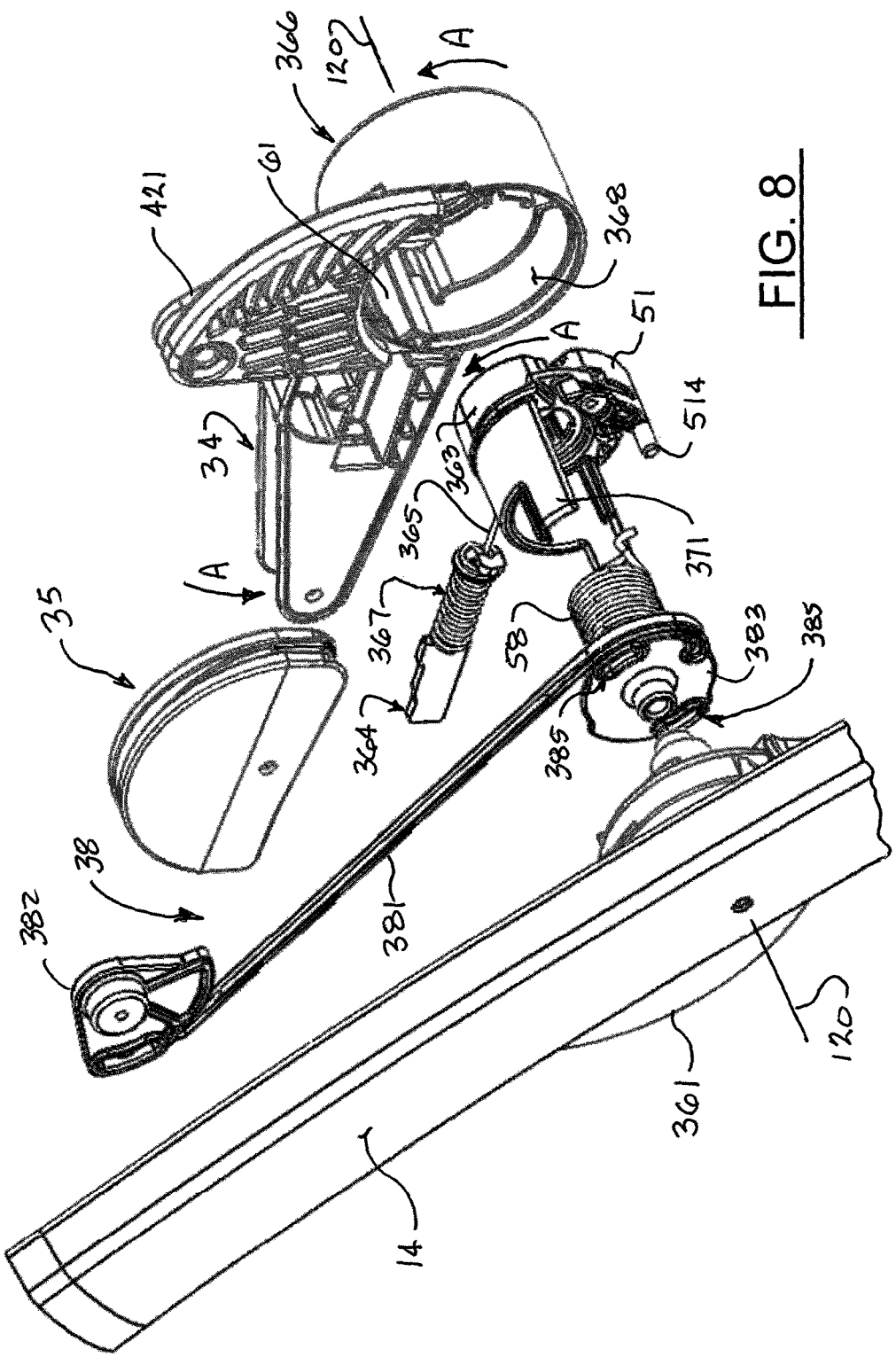
FIGS. 8 through 10 provide an exploded view of one embodiment of the folding mechanism of the present invention.
Figure 9:
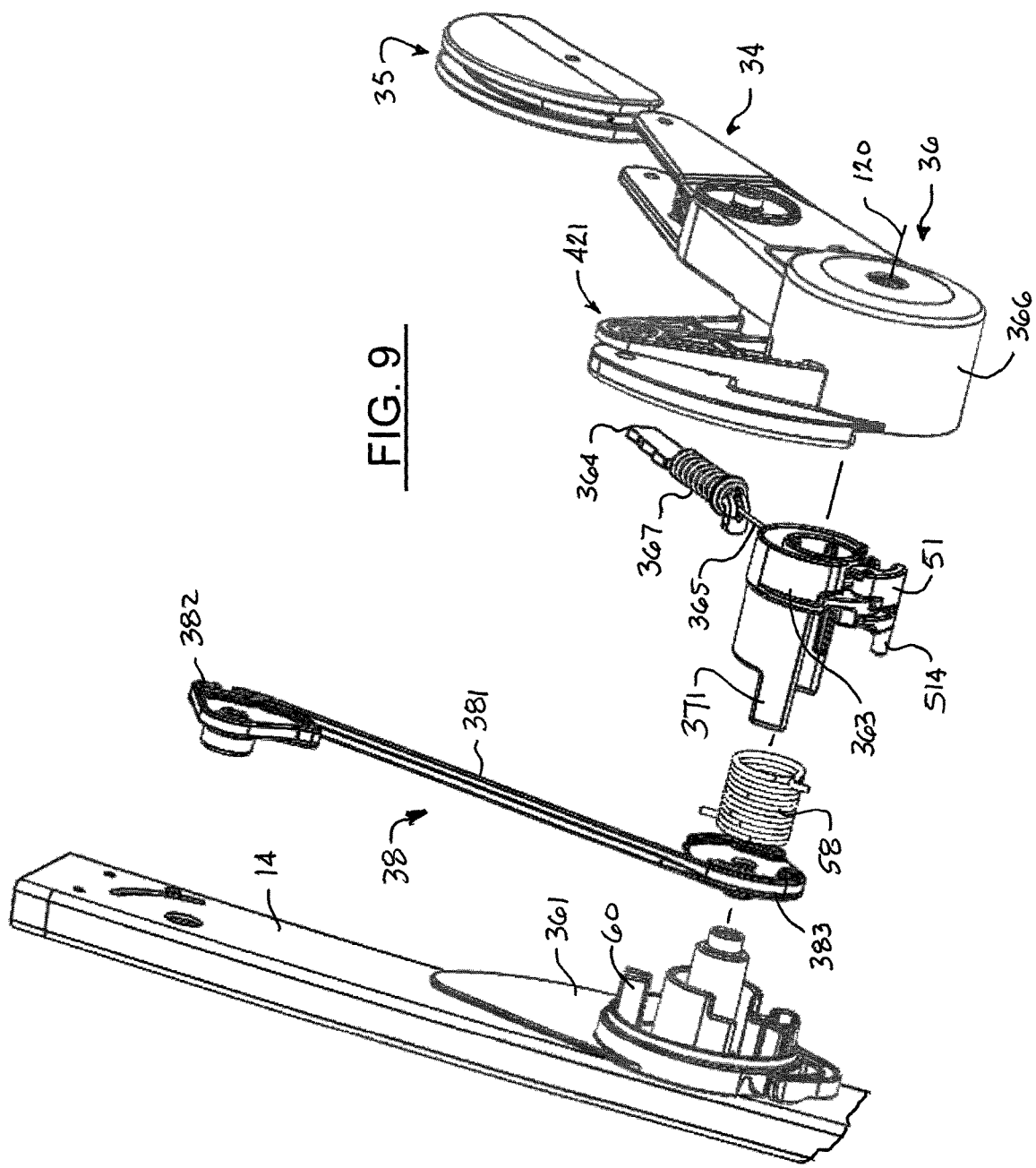
Figure 10:
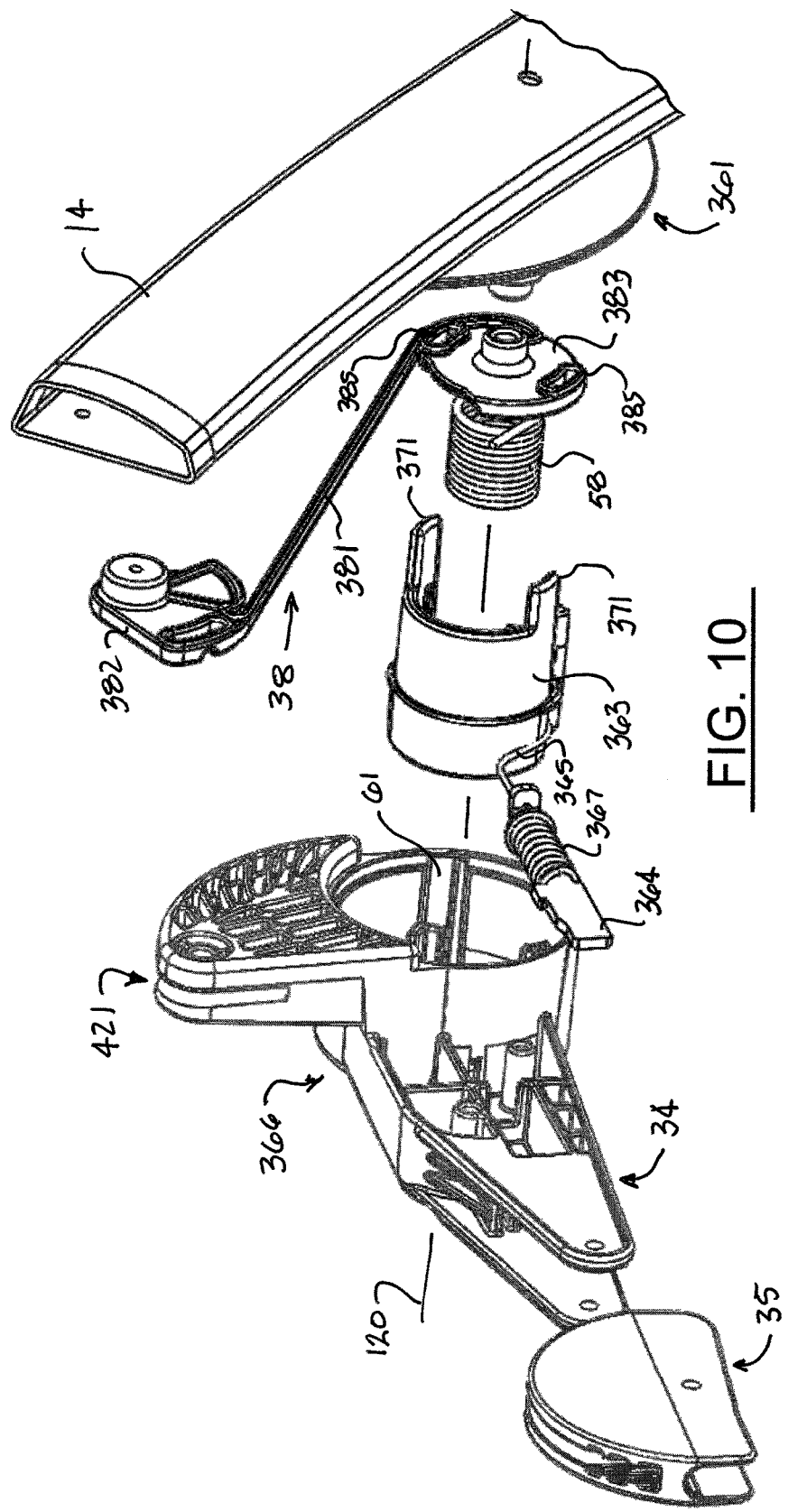
Figure 11:
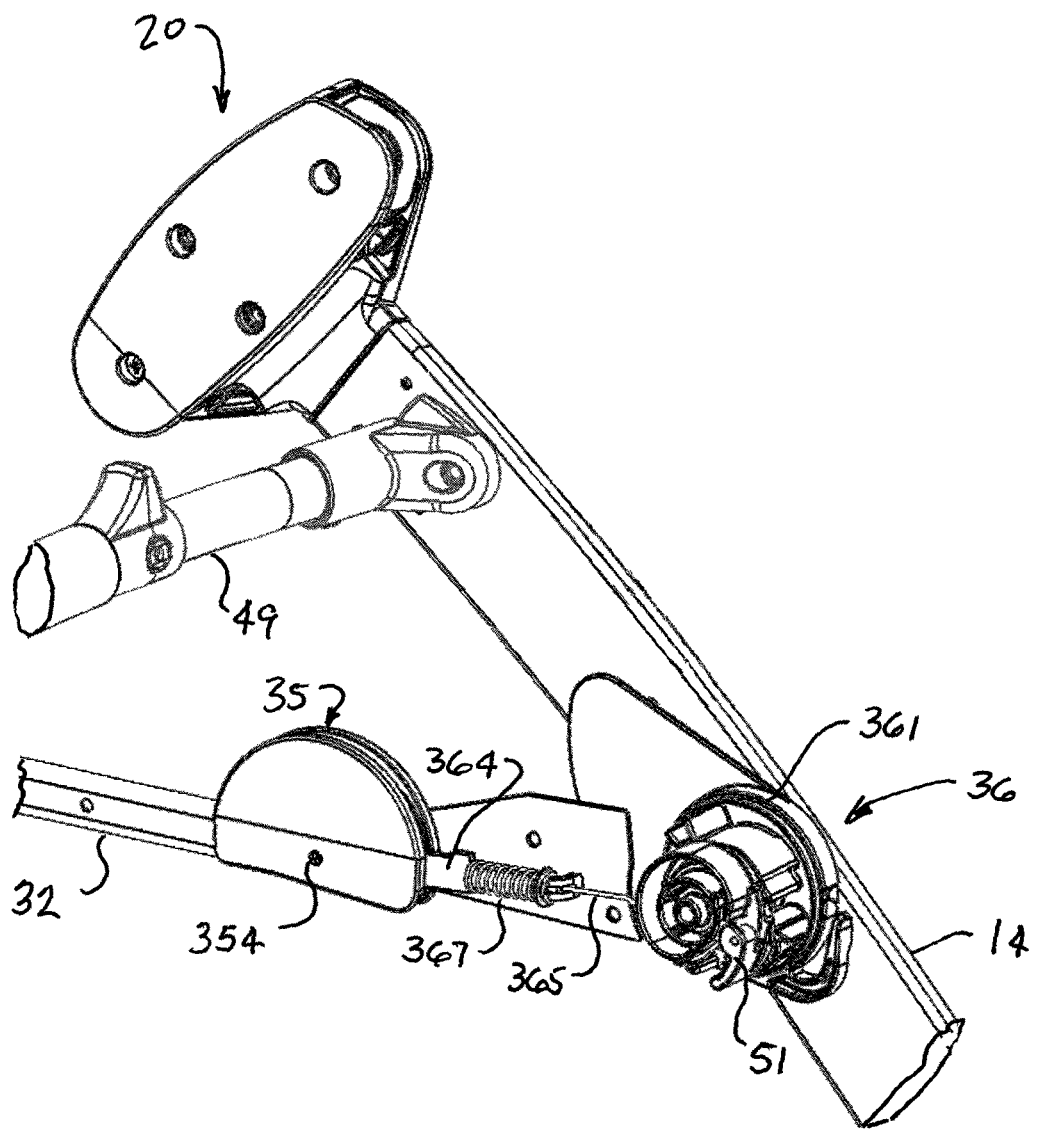
FIGS. 11 through 17 show details views of various components of the folding mechanism.
Figure 12:
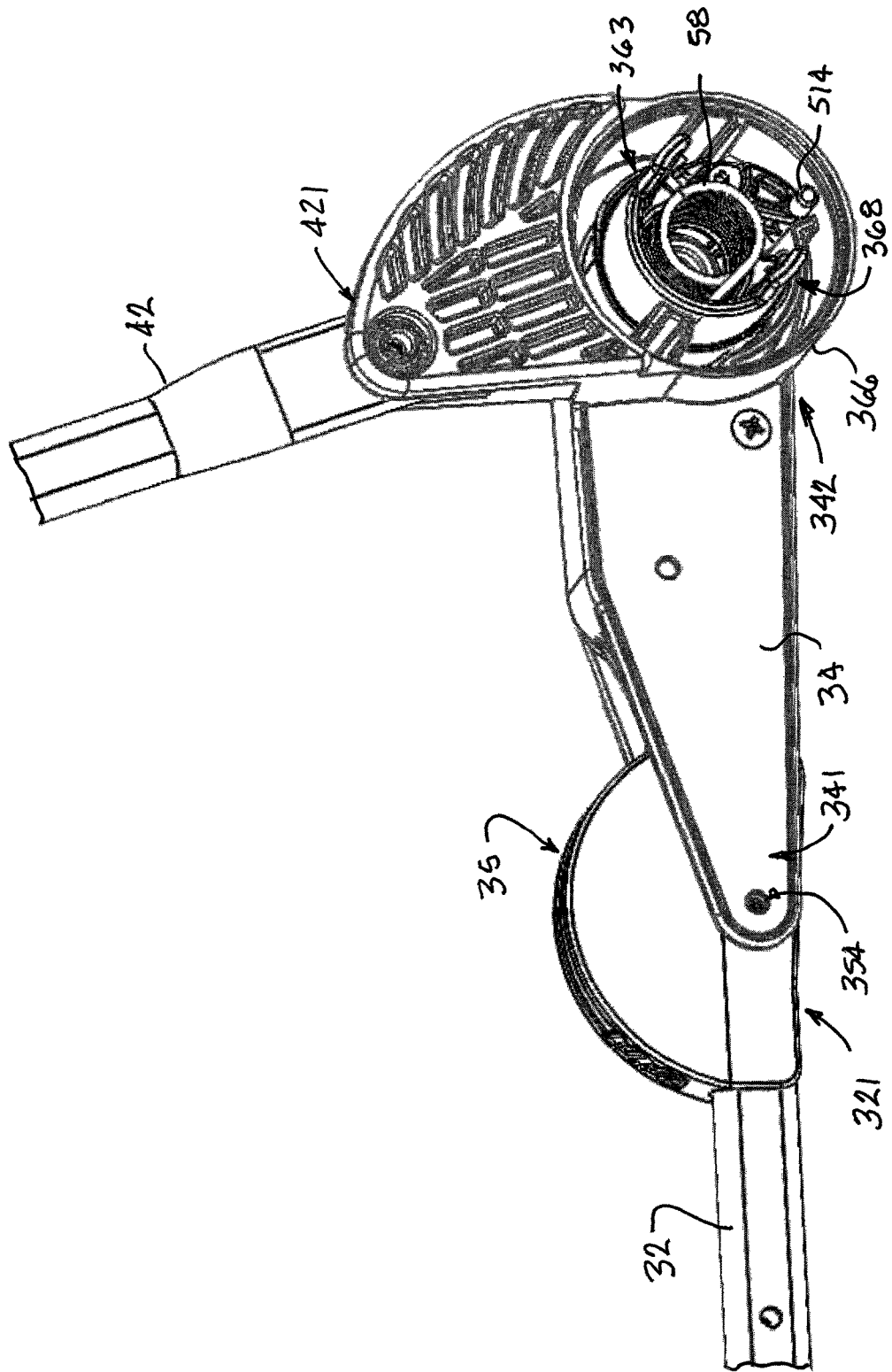
Figure 13:
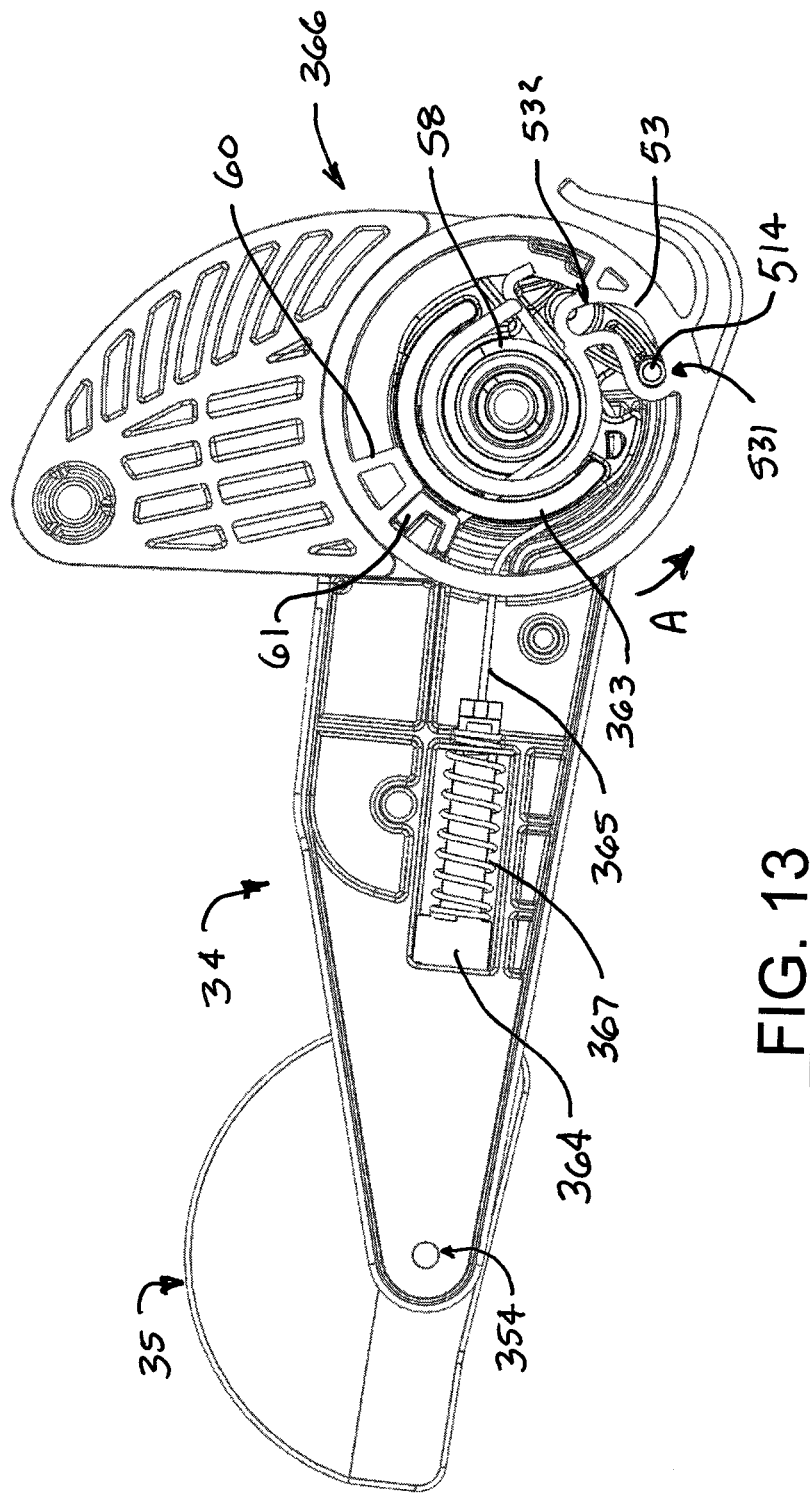
Figure 14:
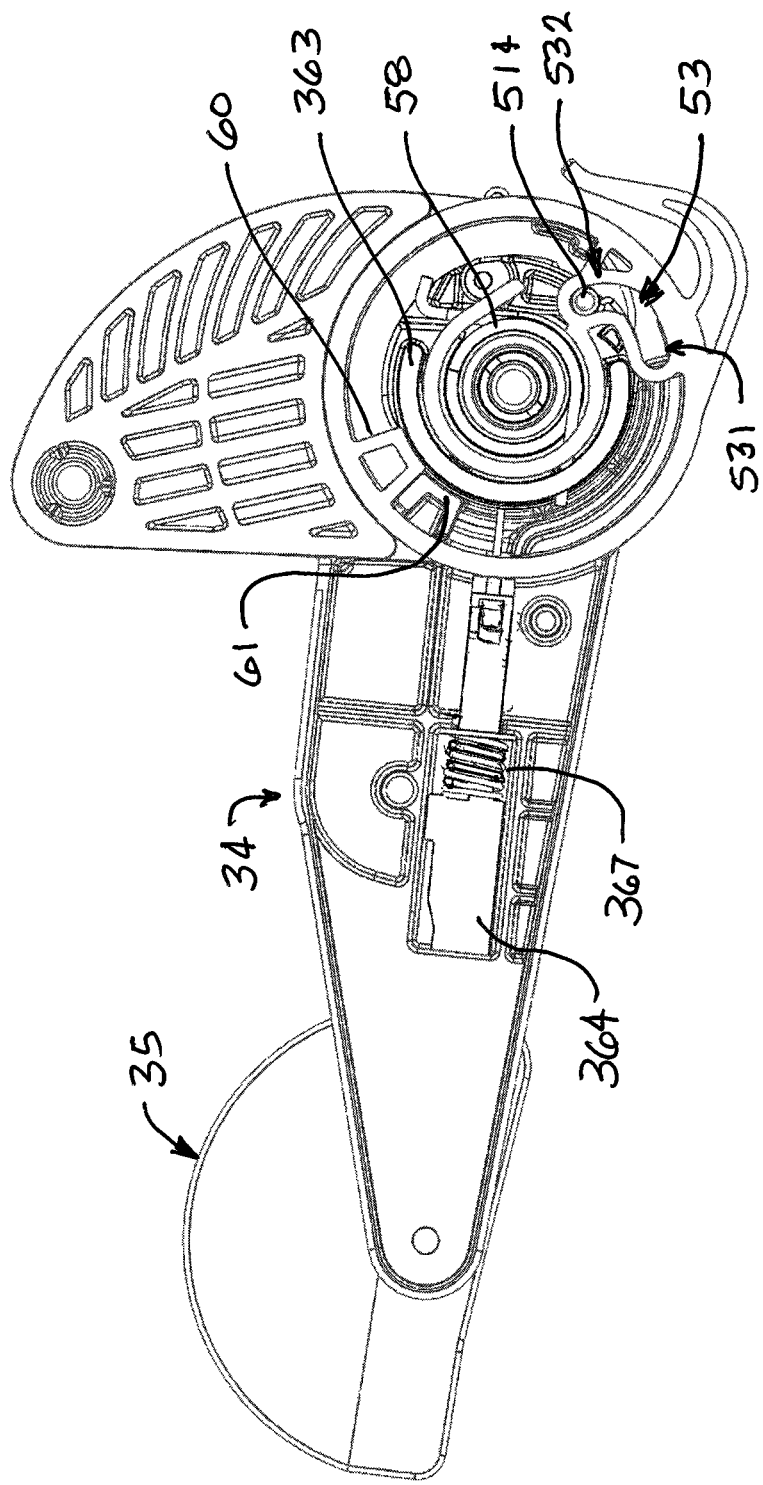
Figure 15:
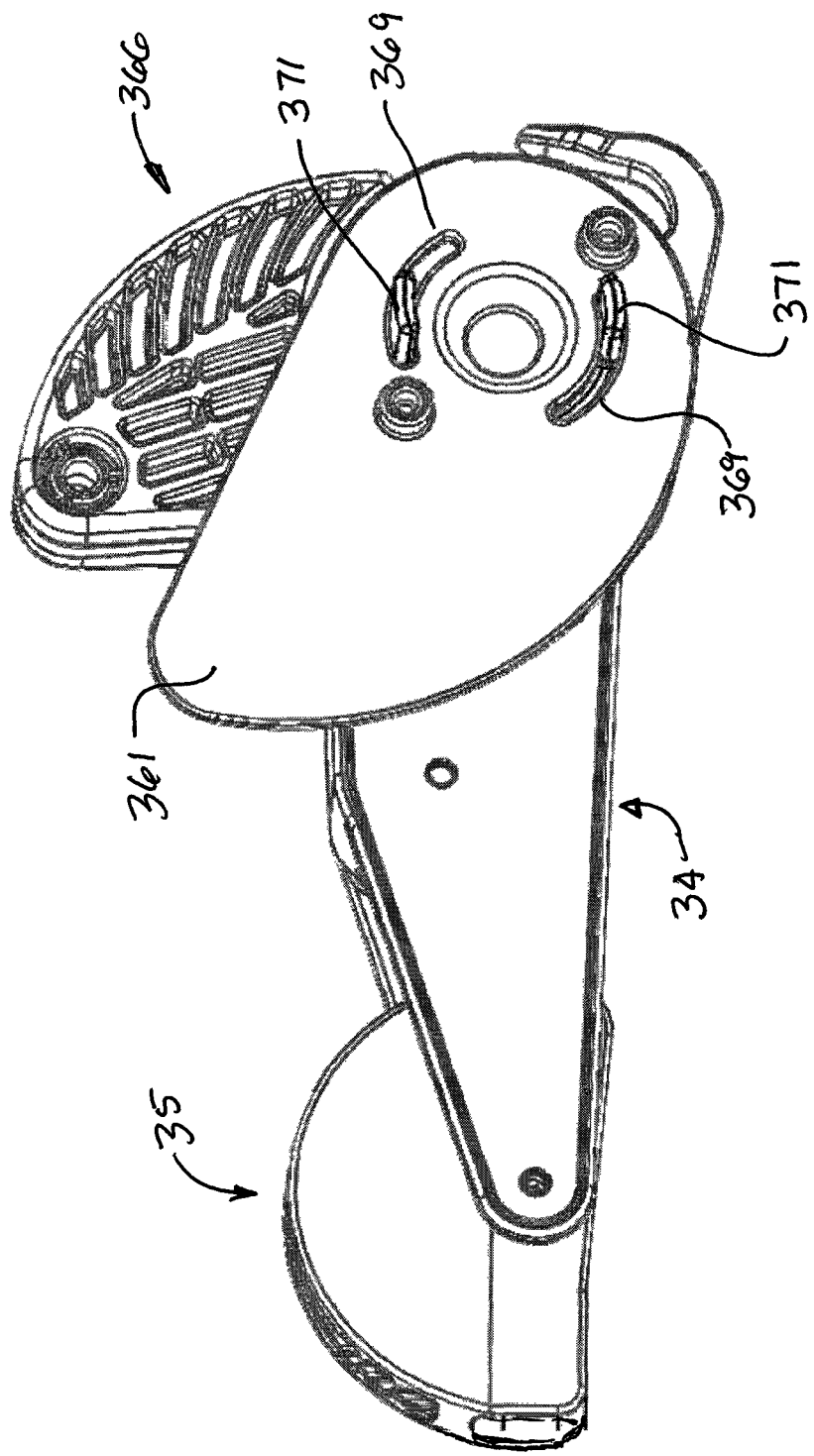

The forward and rearward portions 32, 34 are generally aligned when the stroller frame 10 is in the deployed configuration (FIGS. 1 and 2), and arranged to fold generally downwardly (moving the pivot connectors 35 downwardly) as the frame is moved toward the folded configuration (FIG. 4). It is preferable to maintain the alignment between the forward and rearward portions 32, 34 at slightly less than 180-degree alignment (slightly under-centered) to reduce the likelihood of binding in the pivot as frame folding is initiated. The downward movement moves the seat base, typically attached to the forward portions 32, into a lower position within the folded frame while angling upwardly and generally into alignment with the front wheel supports 12 any portions of the seat frame that are disposed forward of the front wheel supports 12 in a deployed frame. A linkage 42 interconnecting the rearward portion 34 and the handle support 16 synchronizes folding movement of the handle support 16 with the front and rear wheel supports 12, 14 so that the handle support is moved toward the rear wheel support 14 as the frame 10 folds.

A latching mechanism 36 embodying aspects of the present invention is disposed on the stroller frame assembly in order to maintain the frame in one or more preferred orientations, specifically including the open or deployed for use configuration, and to selectively bias movement of select frame members during the frame folding and unfolding process thereby improving ergonomics of the frame reconfiguration process.

In the illustrated embodiment, the latching mechanisms 36 are disposed on the rear wheel supports 14 and interact with the seat frame 30, specifically the rearward portion 34. Additional connections 421 for operably connecting the handle linkage 42 are provided on the latching mechanisms 36, but these are a matter of design convenience and neither affect nor contribute to the function of the latching mechanisms 36.

As is best illustrated in FIGS. 8 through 17, the latching mechanisms 36 each comprise a first or base mounting structure 361 and a second or movable housing structure 366 arranged to permit relative rotating movement about the rearward axis 120. The base mounting structure is fixedly connected to the rearward wheel support 14 while the second mounting structure 366 is fixedly connected to the rearward portion 34 of the seat frame 30. The second mounting structure 366 is preferably configured to define an interior enclosure for mechanism, though the enclosure could be easily disposed on the base mounting structure 361 or shared between divided so that each mounting structure offered a portion of the enclosure. The arrangement enables pivoting movement about rearward axis 120 between the rearward wheel support 14 and the rearward portion 34 of the seat frame 30. Travel stops 60, 61 limit the relative rotational movement between the first and second mounting structures and allow the limitations of folding movement of the frame to be established.

The latching mechanism 36 further comprises a rotating drive element 363 that is movable in response to movement of a releasing actuator 38 that is operably connected to selectively rotate the drive element 363. Rotation of the drive element 363 is limited to movement between opposing first and second positions by interaction between travel limiters 371 disposed on the drive element 363 interacting with travel stops 369 disposed on the first mounting structure 361. The first and second directions correspond to movement toward deploying and collapsing of the frame, respectively. Movement toward frame collapsing is indicated by directional arrow "A" in the figures. A biasing spring 58 is provided in the latching mechanism and configured to interact between the base mounting structure 361 and the drive element 363 and urge the drive mechanism toward a first position, best illustrated in FIG. 18.

The releasing actuators 38R, 38L are operably connected by lever connectors 382 to a release handle 49 which is moveably connected to the frame 10. The handle 49 through the releasing actuators 38R, 38L synchronizes movement of the right and left side latching mechanisms 36R, 36L and their respective drive elements 363 so that both sides are simultaneously actuated. In the embodiment illustrated, a drive connector 381 connects lever connectors 382 to 383 to engage one or more apertures 385 with the travel limiters 371 on the drive elements 363. The release handle 49 is moveable between a latched and a released position. A safety latch may be provided to prevent accidental movement of the release handle 49 and the resultant unintentional unlatching of the latching mechanisms 36. Handle 49 movement toward the released position (arrow "A") preferably coincides with upward movement of the release handle 39 as would occur when lifting the frame 10 by the handle. The upward movement of the release handle 49 displaces the releasing actuators 38 which, in turn, releases the latching mechanisms 36, allowing the frame to fold as it is being lifted by the handle. Once the release handle 49 reaches the released position, further upward movement lifts the rear wheel supports 14 to which the release handle is connected, elevating the folding joints 20 and enabling gravity to assist in frame folding.

A tension actuator 365 operably connects the drive element 363 and a locking element 364 which interacts with the pivot connector 35. The locking element 364 is biases toward an extended positon by spring 367, the function of which will be discussed hereinafter. A movable trigger element 51 is also connected to the drive element 363. Trigger element 51 is pivotally connected to the drive element 363 at a proximal end and has a cam follower 514 disposed at the distal end. Movement of the trigger element 51 is controlled by a generally J-shaped cam 53 disposed on the base structure 361 and the rotational position of the drive element 363.

Movement of the drive element 363 by the releasing actuator 38 or the bias spring 58 causes the trigger element 51 to be moved as the cam follower 514 follows the contours of cam 53. As the drive element 363 is driven by the biasing spring 58 toward the first position of the drive element, the cam follower 514 is moved toward the first or trigger end 531 of the cam 53 causing generally outward movement of the trigger element 53. Movement of the drive element 363 in the opposite direction toward the second position of the drive element causes inward movement of the trigger element 51 as the cam follower 514 is drawn toward the second or retracted end 532 of the cam 53.

The second mounting structure 366 which is connected for rotational movement with the rearward portion 34 of the seat frame includes a blocking structure 368 inwardly disposed and extending partially around the interior circumference of the second mounting structure 366. As the seat frame 30 is being folded while the cam follower 514 is being held in the retracted end 532 by the actuator 38, the second mounting structure 366 rotates in a first or folding direction and positions the blocking structure 368 proximate to the cam follower 514. The blocking structure 368 is configured to prevent the cam follower 514 from returning to the trigger end 531 when the releasing actuator 38 is released which would normally permit the force of the biasing spring 58 to drive the drive element 363 to the first position. As the second mounting structure 366 is moved in a second or unfolding direction, the blocking structure 368 will be rotated until a driving end 373 moves into a position adjacent to the cam follower 514. At this point, the cam follower 514 is no longer inhibited from movement toward the trigger end 531 of the cam 53. As the cam follower 514 moves outwardly, it contacts the driving end 373 of the blocking structure. The trigger end 531 of the cam prevents the cam follower 514 from moving inwardly, thus restraining the cam follower 514 against the driving end 373. By locking the drive element 363 against the second mounting structure 366, the biasing force of bias spring 58 acts between the first mounting structure 361 and the second mounting structure 366. As viewed on the stroller frame, the biasing force is urging the seat frame 30 toward the deployed position shown in FIGS. 1 and 2. The result is a mechanism that enables the biasing force of the bias spring 58 to be applied to the joint in a first direction (unfolding) only as the frame nears the fully unfolded orientation. The mechanism isolates the biasing force from the joint when the frame is moved away from the fully unfolded (deployed) position so that the bias force does not resist folding movement of the frame.

Figure 2:
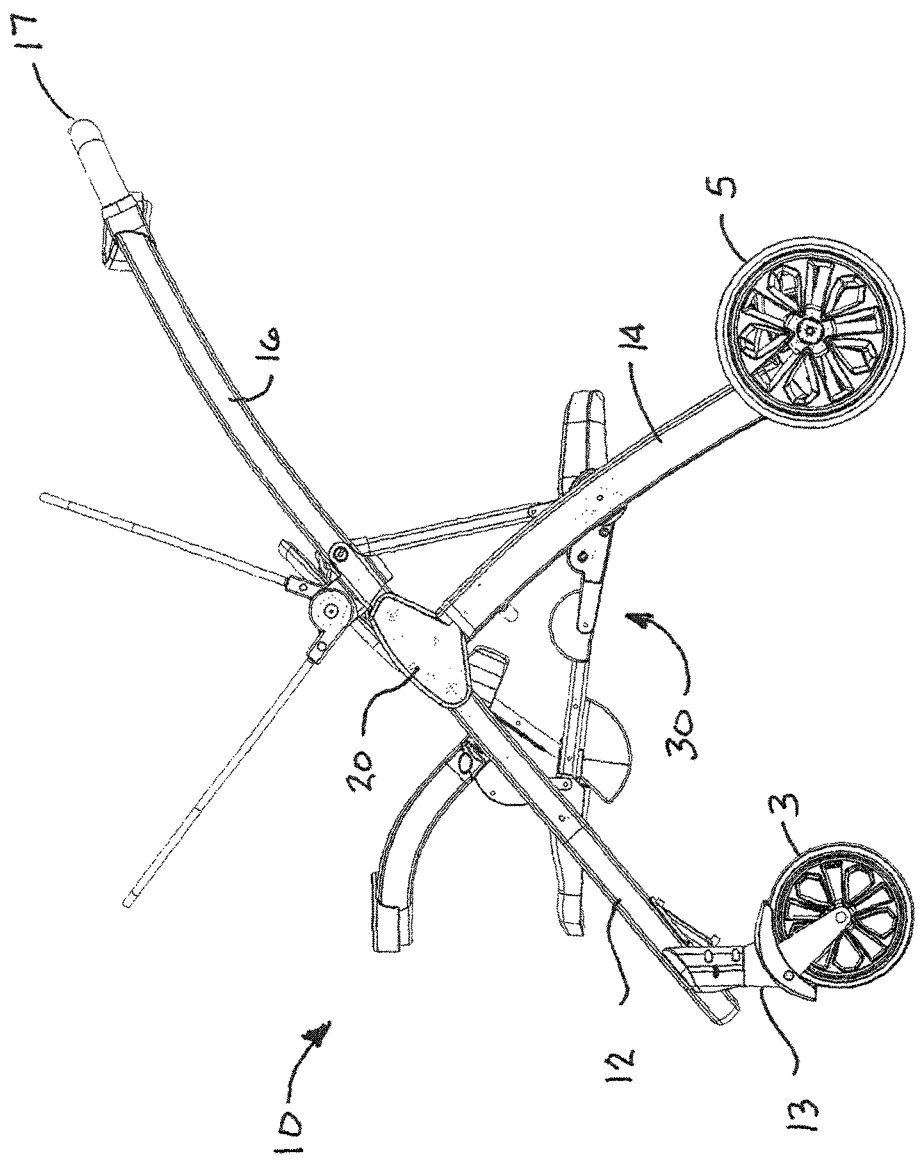
FIG. 2 is a side view of the folding stroller frame of FIG. 1 shown deployed for use.
Figure 3:
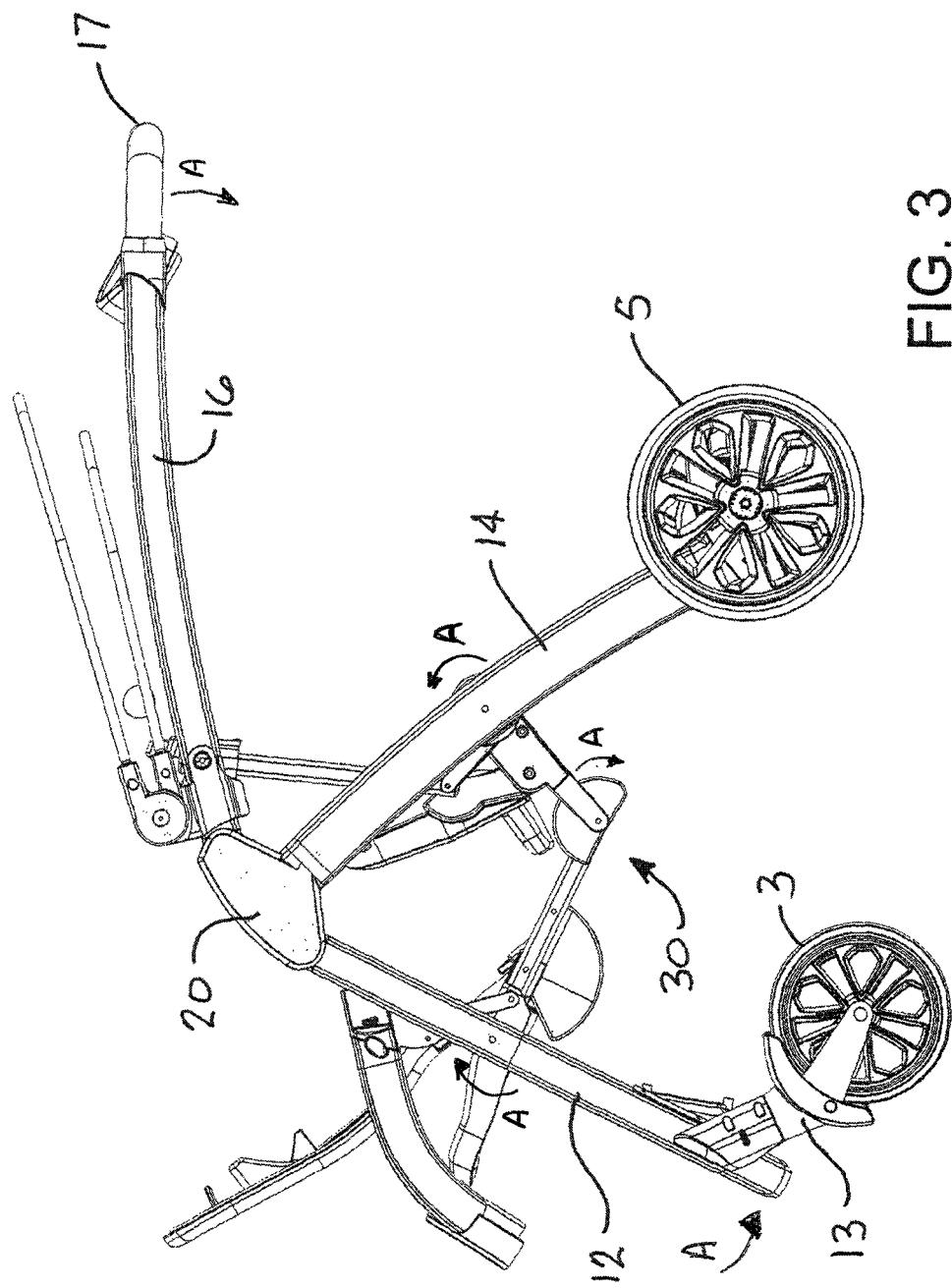
FIG. 3 is a side view of the folding stroller frame of FIG. 1 shown in a partially folded configuration.
Figure 16:
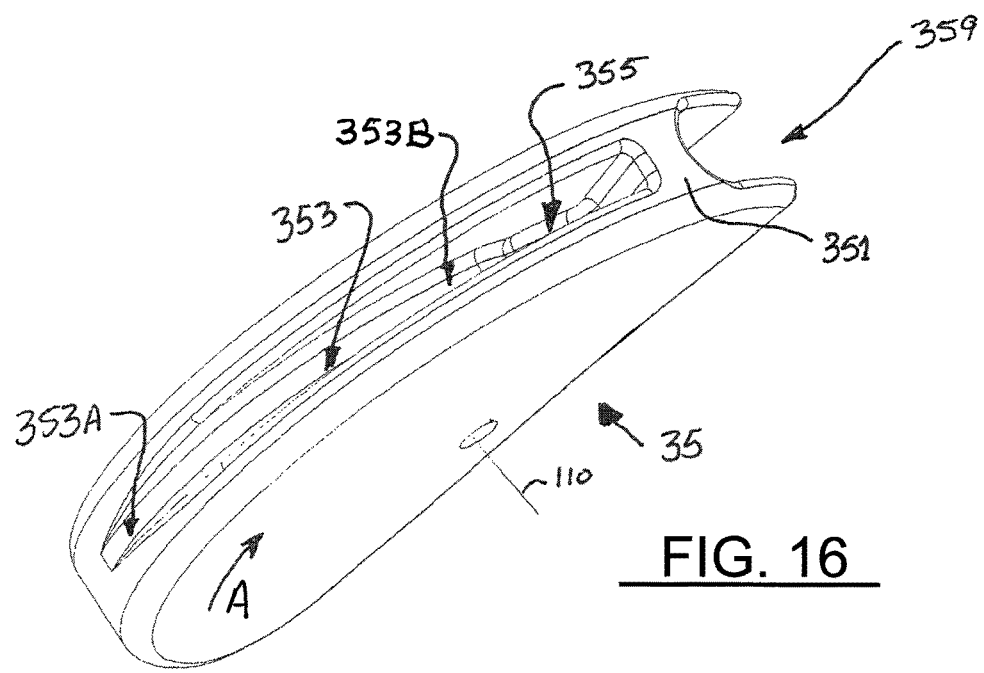
Figure 17:
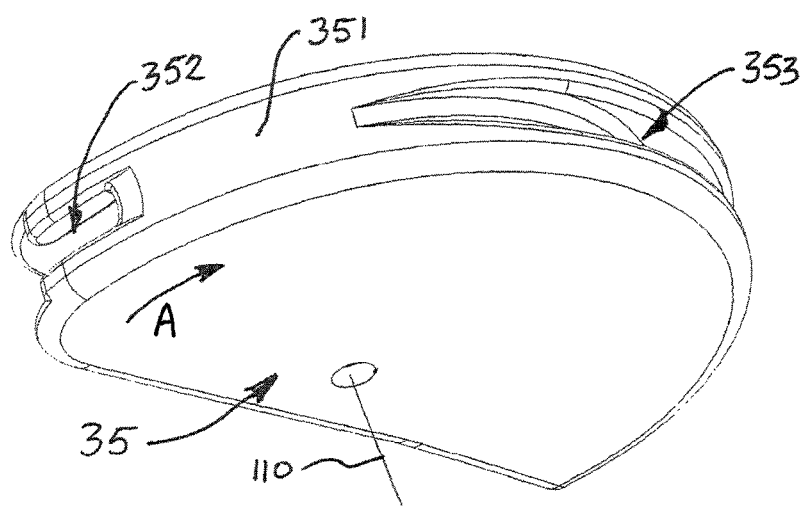

Referring to FIGS. 16 and 17, each pivot connector 35 is fixedly connected to the proximal end 321 of the forward portion 32 of the seat frame 30. Each pivot connector 35 comprises a pivot connection 354 which allows the rearward portion 34 to be pivotally coupled thereto and a bearing surface 351 against which the locking element 364 is forced into contact by the biasing spring 367. The locking element is operably connected via a tension actuator 365 to the drive element 363. A deployed positioning stop 352 is provided on the pivot connector 35 which, when engaged by the locking element 364, fixes the forward and rearward portions 32, 34 in a generally linear arrangement which serves as a base frame for a seat in the stroller frame (FIGS. 1 and 2). It is preferable to maintain the alignment between the forward and rearward portions 32, 34 at slightly less than 180-degree alignment (slightly under-centered) to reduce the likelihood of binding in the pivot as frame folding is initiated. Retraction of the locking element 364, caused by rotation of drive element 363 in the release direction (arrow "A") displaces tension actuator 365 and withdraws the locking element from contact with the pivot connector 35. Once unlocked, the pivot connector 35 may rotate with respect to the rearward portion 34 allowing the articulated seat frame 30 to begin folding. The movement of the locking element 364 in relation to the locking pivot 35 during the stroller folding process is illustrated in FIGS. 16 and 17 as arrow "A" and also coincides with folding frame movements indicated by arrow "A" in other figures.

The force of the releasing actuator 38 on locking element 364 via the drive element 363 and tension actuator 365 also creates a torque on the latching mechanism 36 pivot joint (about axis 120) which is opposite to the torque applied by the bias spring 58 when engaged. This reverse torque drives the second mounting structure 366 in the direction of arrow "A" which assists in initiating folding movement of the seat frame 30 and folding of the stroller frame 10.

Once unlatched, the locking element 364 may slidingly engage the peripheral surface 351 of the locking pivot. The peripheral surface 351 is generally uniformly radially spaced from first pivot axis 110 of the pivot connection 354. The extent of the peripheral surface 351 is sufficient to permit folding of the forward and rearward portions 32, 34, and may approach 180 degrees of pivoting motion. A cam surface 353 may be provided in the peripheral surface 351 to enable the inward force of the locking element 364 against the cam surface 353 to urge relative movement of the forward and rearward portions. The leading end 353A of the cam surface 353 begins at the peripheral surface while the trailing end 353B is inwardly displaced (having a radius from the first pivot axis 110 that is less than the radius of the leading end 353A). In the exemplar embodiment the cam surface 353 is configured to urge the articulated seat frame 30 toward the folded configuration (FIG. 4) once the mechanism has been unlatched and initial folding movement initiated. One or more detents 355 may be provided in the cam surface to define desired positions in the frame folding movement, such as the fully folded position. The detent 355 enables the stroller frame 10 to better remain in a folded position until a user opts to unfold by releasing the biasing pressure on the locking element 364 by lifting the handle 39.

Movement of the latching mechanism 36 and locking pivot 35 as the stroller frame 10 is moved between the deployed and the folded position is illustrated in FIGS. 18 through 23 and described hereinafter.

The latching mechanism 36 imposes biasing forces on the frame 10 at discreet frame orientations during the folding and unfolding movements to assure frame members move in the desired directions.

Figure 18:
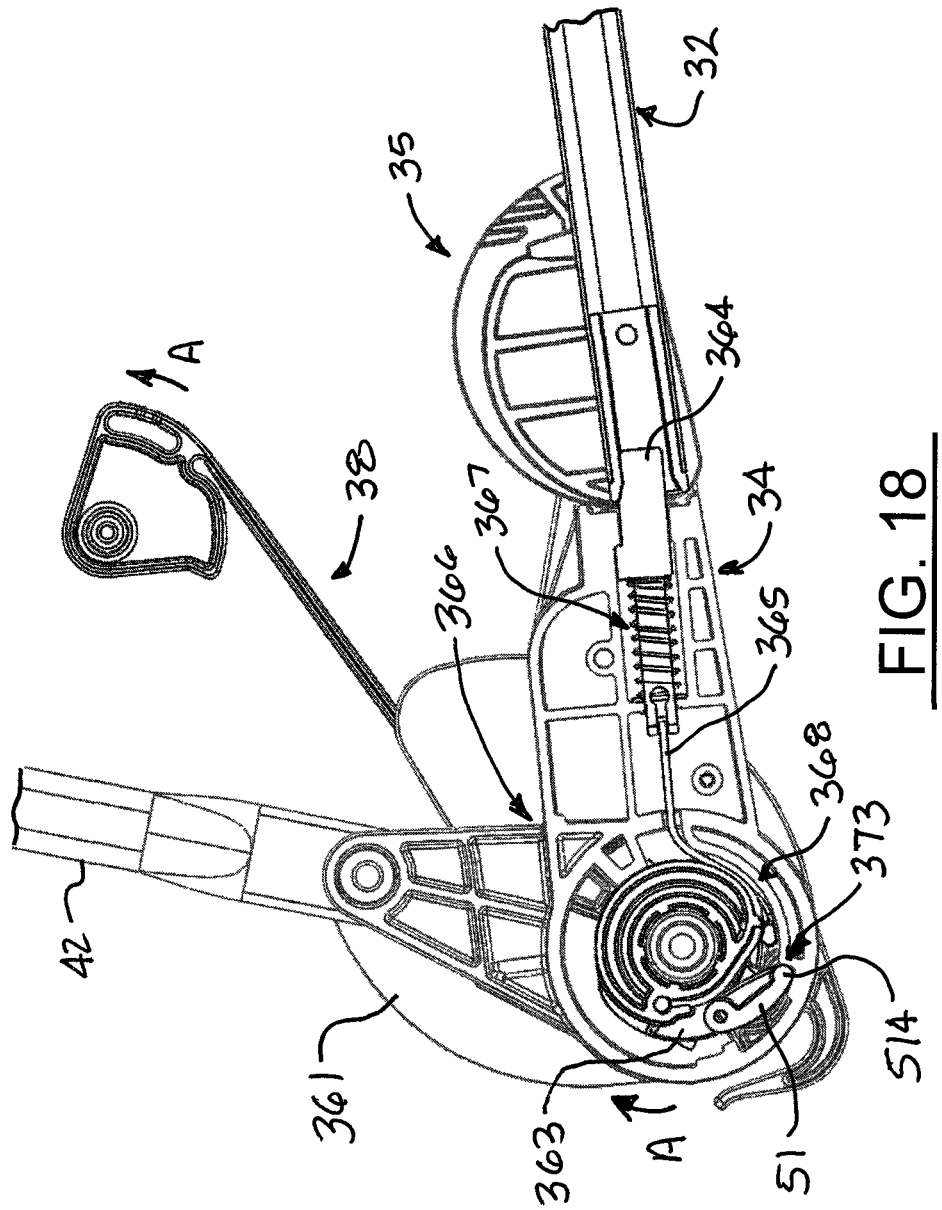
FIGS. 18 through 23 show a progression of foldable frame positions detailing movement within the folding mechanism as the frame is moved between the deployed and folded positions.

In FIG. 18, the drive element 363 is shown in a first position corresponding to the fully deployed orientation of the stroller frame 10. The trigger element 51 is in the first or generally outward position with the cam follower 514 disposed in the trigger end of the cam 53 and in pushing contact with the driving end 373 of the blocking structure 368. The force of the bias spring 58 is applying torque to the drive element in the counter-clockwise direction, as shown, and thereby urging the proximal end 341 of the second portion 34 of the seat frame upwardly. The position of the drive element 363 also relaxes tension on the tension actuator 365 so that the locking element 364 is urged into the first or locked position and maintained therein with the deployed position stop 352 on the pivot connector 35.

Figure 19:
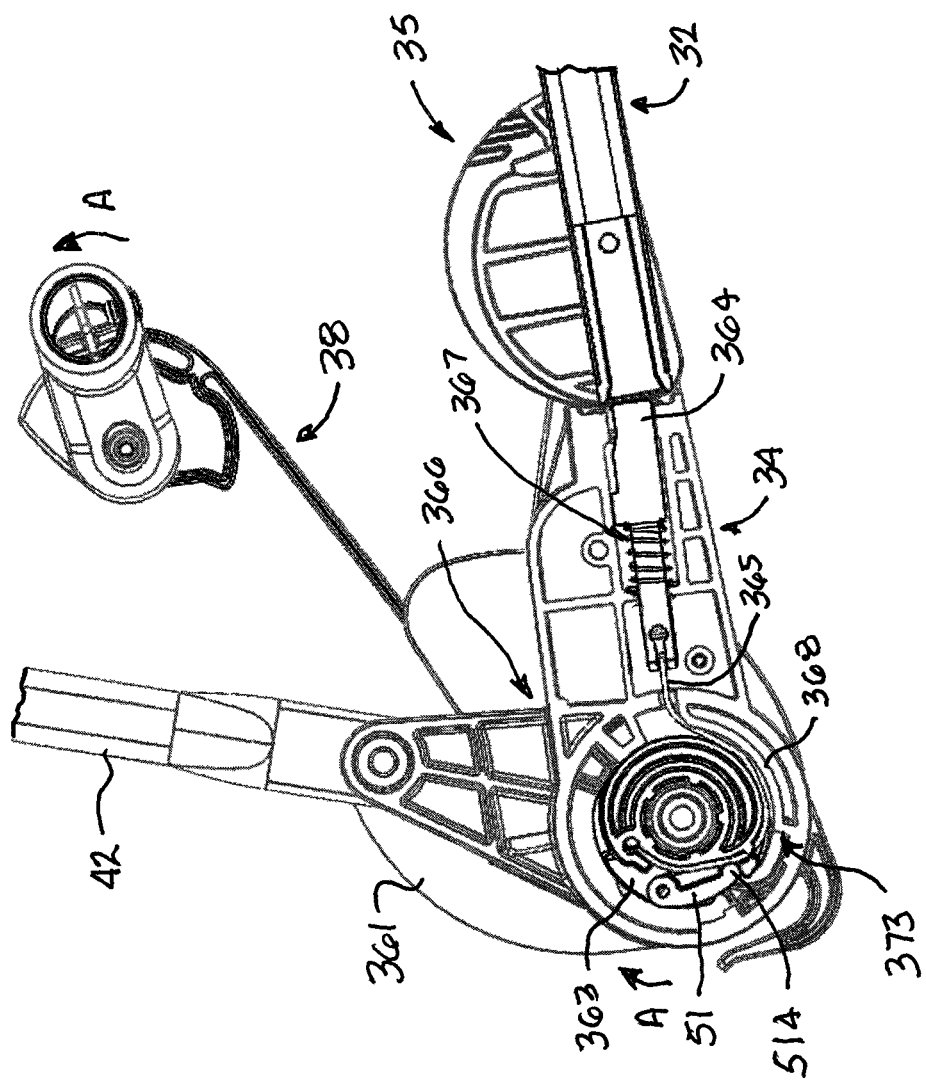

To initiate folding, as best illustrated in FIG. 19, the release handle is initially lifted which acts on the upper end of release actuator 38 (moving in direction of arrow "A") causing rotation of the drive element 363 (clockwise as illustrated) against the torque of the bias spring 58. Clockwise rotation of the drive element 363 causes the trigger element 51 to be repositioned inwardly to the second or retracted position as the cam follower 514 moves toward the retracted end 532 of the cam 53. The force of the bias spring 58 acting on the driving element is temporarily overcome by the releasing force applied by the release handle through the release actuator 38. The clockwise rotation of the drive element 363 also tensions the tension actuator 365, compresses biasing spring 367, and withdraws the locking element 364 from engagement with the deployed position stop 352 on the pivot connector 35. Once the locking element 364 is withdrawn, the pivot connector 35 may rotate relative to the rearward portion 34. Furthermore, the force of the releasing actuator 38 on locking element 364 via the drive element 363 and tension actuator 365 also creates a torque on the latching mechanism 36 pivot joint which is opposite to the torque applied by the bias spring 58 when engaged. This reverse torque drives the second mounting structure 366 clockwise (direction of arrow "A") which further assists in initiating the desired folding movement of the seat frame 30.

Figure 20:
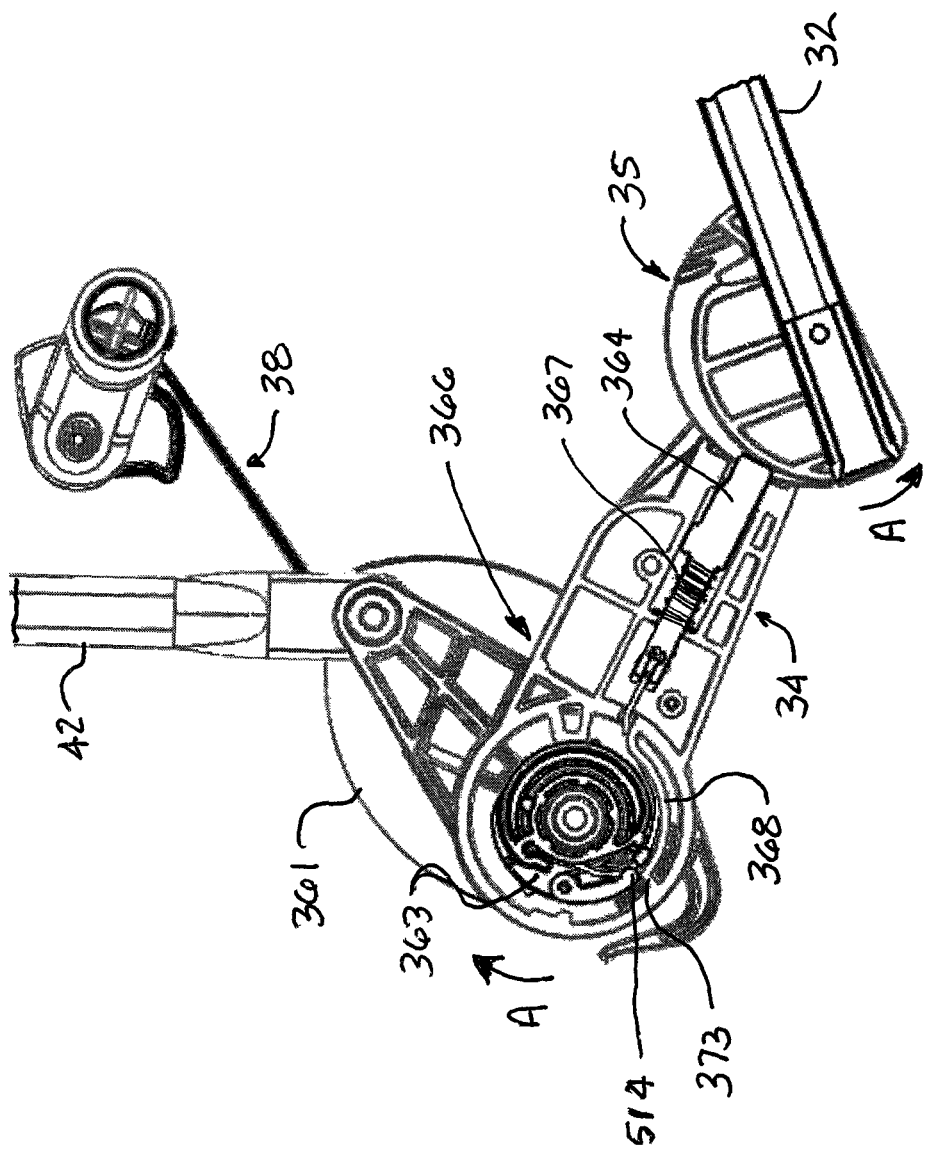

In FIG. 20 the stroller frame is being folded and moved toward the folded position. The rearward portion 34 of the seat frame is rotating clockwise (arrow "A") which repositions the block structure 368 so that it traps the cam follower 514 in the retracted end 532 of the cam 53. Once this occurs, the torsional force of the bias spring 58 is restrained and isolated from the second mounting portion 366, even as the lifting force on the release handle/release actuator 38 is removed. The configuration of the retracted end 532 of the cam 53 may allow limited rotation of the drive structure 363 in the counter-clockwise direction to enable the locking element 364 to engage the surface 353 of the pivot connector.

Figure 21:
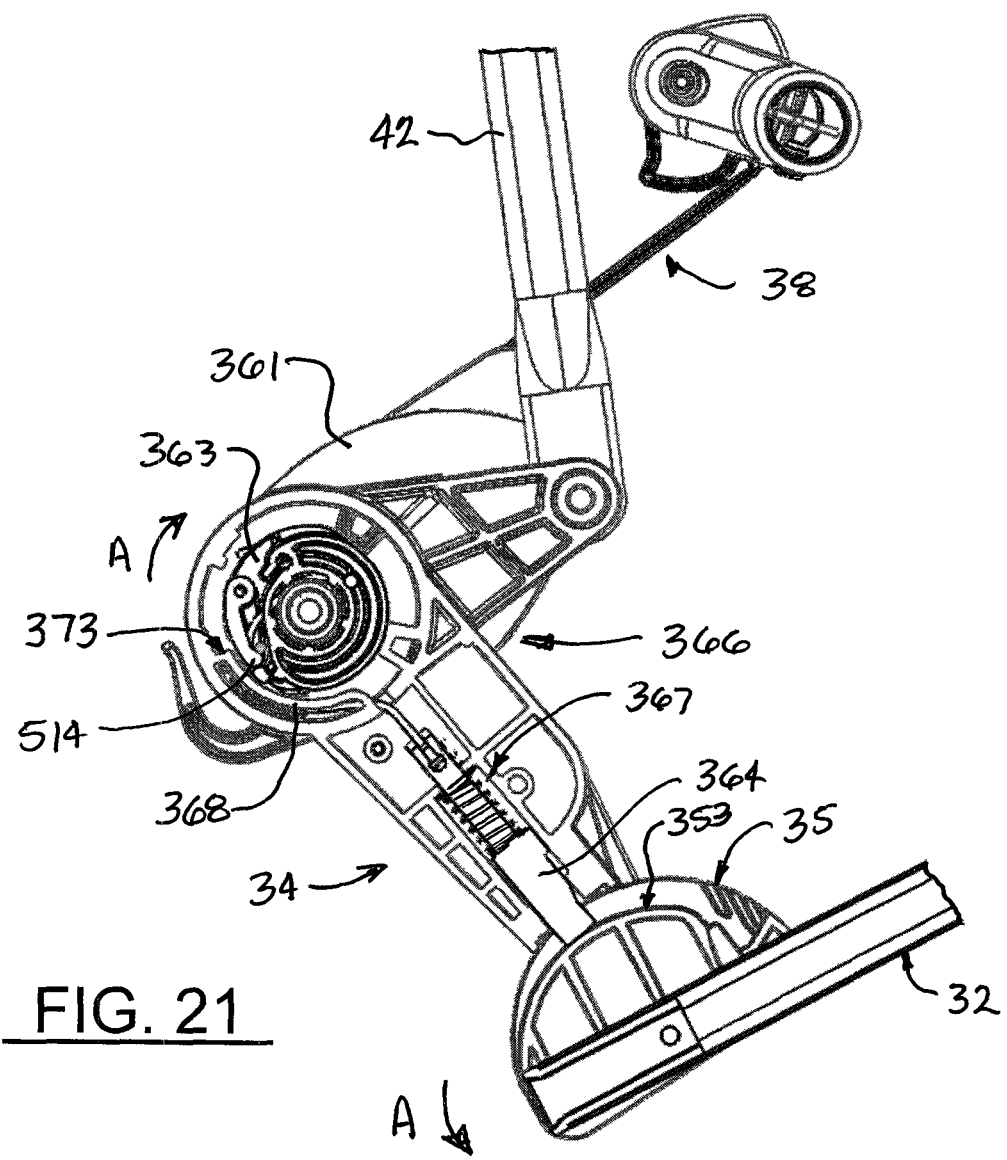

In FIG. 21, folding of the stroller frame continues and is shown near a mid-fold orientation. The block structure 368 extends sufficiently around the interior of the second mounting structure housing so that it continues to trap the cam follower 514 in the retracted end 532 of the cam 53 and isolate the torsional force of the bias spring 58 from acting on the second mounting portion 366. The lifting force on the release handle/release actuator 38 may be removed at this point or the user may continue to be lifting the frame by the release handle. In either circumstance, tension in the release actuator 38 does not affect the drive element 363, but continues to provide a clockwise torque on the joint with assists in the folding motion. The configuration of the retracted end 532 of the cam 53 may allow limited rotation of the drive structure 363 in the counter-clockwise direction to enable the locking element 364 to engage an arcuate surface 351 of the pivot connector. As is illustrated, the locking element 364 is engaging the surface and is being urged into the first end 353A of tapered cam surface 353. The driving force of biasing spring 367 on the locking element 364 contributes to the folding motion in the pivot connector.

Figure 22:
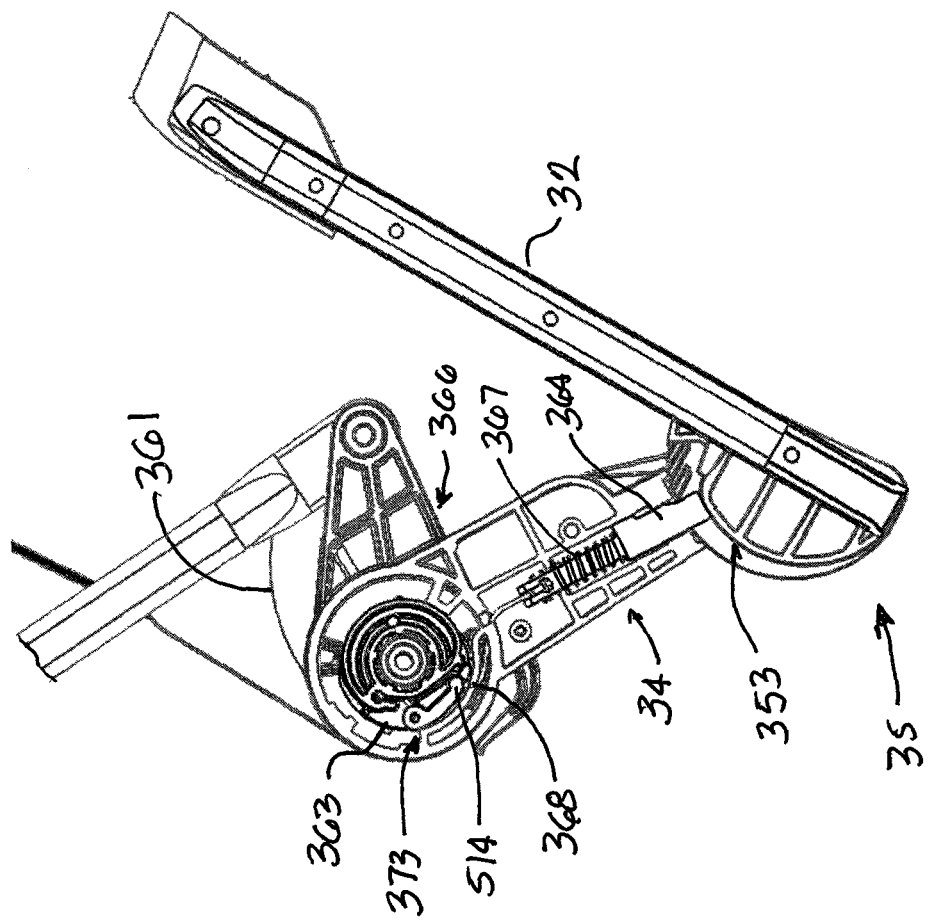

Folding movement of the frame 10 has progressed in FIG. 22 which illustrates the seat frame 30 as it approaches the folded position. The block structure 368 continues to trap the cam follower 514 in the retracted end 532 of the cam 53 and isolate the torsional force of the bias spring 58 from acting on the second mounting portion 366. The lifting force on the release handle/release actuator 38 may be removed at this point or the user may continue to be lifting the frame by the release handle which, if present continues to provide a clockwise torque on the joint with assists in the folding motion. The locking element 364 is engaging the surface and is being urged into the tapered cam surface 353 at a second end 353B which is inwardly radially displaced from the first pivot axis 110 in relation to the first end 353A to further contribute to the folding motion in the pivot connector.

Figure 23:
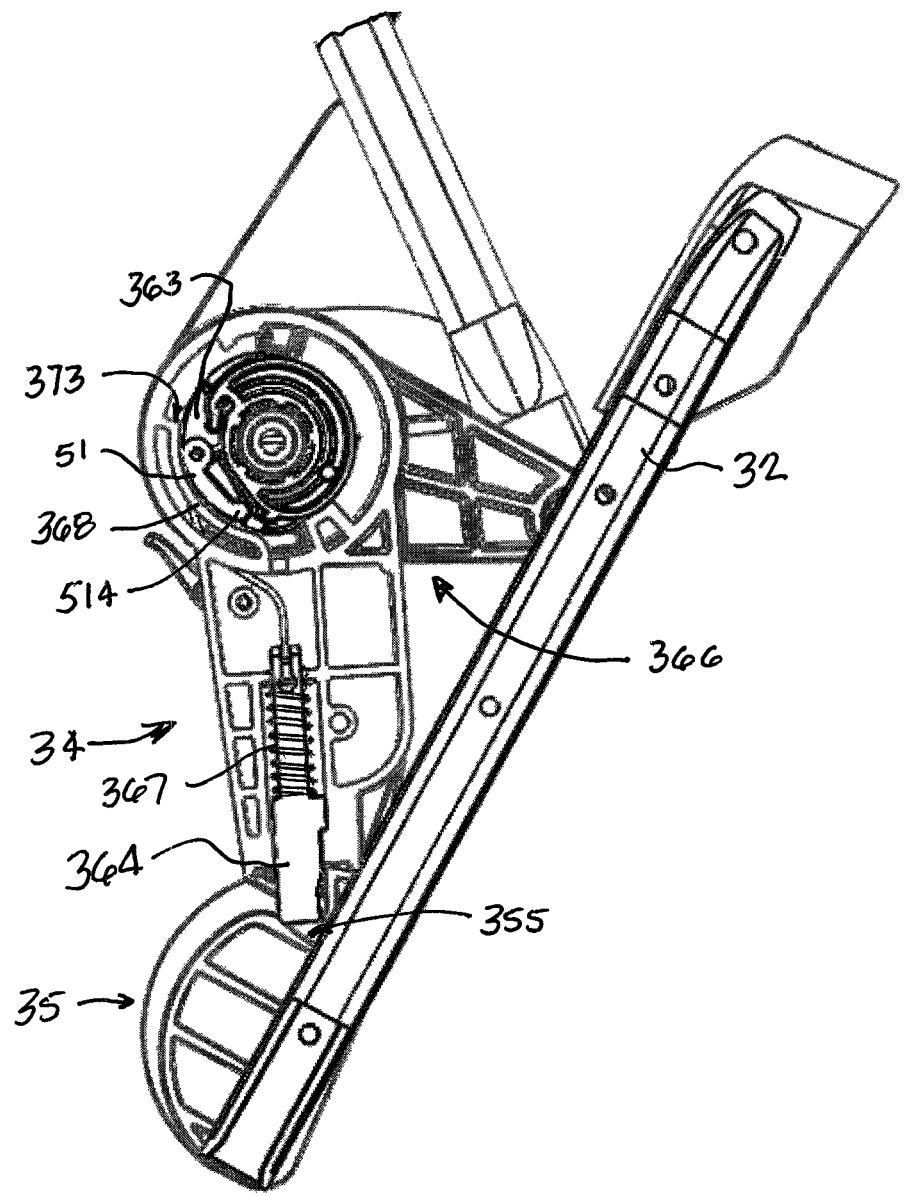

Finally, in FIG. 23 the fame has reached the fully folded configuration. The cam follower 514 remains in the retracted end 532 of the cam 53, blocked by the block structure 368, and isolating the torsional force of the bias spring 58 from acting on the second mounting portion 366. The lifting force on the release handle/release actuator 38 is most likely removed at this point. The pivot connector 53 arcuate surface 351 may include a locking detent 355 into which the locking element 364 may engage when the stroller reaches the fully folded configuration to retain the stroller in the folded configuration until released by actuating the release handle to withdraw the locking element 364.

Unfolding the frame reverses the sequence. The release handle/release actuator 38 need only be activated if a locking detent 355 is included. It is preferred to omit this feature as it requires an extra step in the unfolding operation. Unfolding movement is generally gravity assisted through the configuration of the frame. As the frame nears the configuration shown in FIG. 20, the block structure 368 has been rotated by movement of the second mounting structure 366 and the rearward portion 34 of the seat frame 30 that is fixedly connected thereto to an orientation at which the driving end 373 of the blocking structure 368 is positioned adjacent to the cam follower 514. The cam follower 514 is driven by the force of the biasing spring 58 from retracted end 532 to the trigger end 531 of the cam where the cam follower 514 is then prevented from moving inwardly by the trigger end 531 contour and thus in the inward surface of the blocking structure 368. Thus the cam follower 514 is restrained against the driving end 373 of the blocking structure 368 which is integral to the second mounting structure 366. By locking the drive element 363 against the second mounting structure 366, the biasing force of biasing spring 58 is allowed to act between the first mounting structure 361 and the second mounting structure 366. As viewed on the stroller frame in FIG. 20, the biasing force is urging the second mounting structure 366 counterclockwise and the second portion 34 of seat frame 30 generally upward toward the deployed position. The result is a mechanism that enables the biasing force of the bias spring 58 to be selectively applied to the joint in a first direction (unfolding), but only as the frame nears the fully unfolded orientation, but isolates the biasing spring forces from the mechanism during the folding operation during which the biasing spring would oppose the folding motion.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

I claim:

1. A folding mechanism for a collapsible stroller frame, the frame having a forwardly extending front support, a rearwardly extending rear support, an upwardly extending handle support, and a folding joint connecting respective proximal ends of the front, rear, and handle supports in a manner enabling folding movement thereof, the folding mechanism comprising:
    a seat frame having an elongate first extension having a distal end pivotally connected to the front support, an elongate second extension having a distal end pivotally connected to the rear support, the first and second extensions having respective proximal ends connected by a pivot connector, the seat frame being moveable between generally opposing folded and unfolded positions;
    a frame release actuator moveable between lock and release positions; and
    a latching mechanism disposed on the rear support and operably connected to the second extension distal end, the latching mechanism having a moveable drive element, movement of which is managed by a trigger element, to selectively apply a folding torque to the second extension while blocking application of an unfolding torque on the second extension when the frame release actuator is moved to the unlatched position, and to apply the unfolding torque to the second extension as the stroller frame is unfolded.

2. The folding mechanism of claim 1, further comprising a seat latch moveable between latched and unlatched positions to prevent or permit, respectively, pivoting movement of the seat frame pivot connector, the seat latch being operably connected to the latching mechanism.

3. The folding mechanism of claim 2, wherein the drive element is configured for rotating movement about a pivot axis between generally opposing first and second positions and operably connected to the frame release actuator for movement thereby, the drive element upon rotation to the first position by movement of the frame release actuator to the release position repositioning the seat latch to permit folding movement of the seat frame folding pivot, preventing application of the unfolding torque to the second member, and applying a folding torque to the second member, the drive element, upon rotation to the second position by movement of the frame release actuator to the lock position, engaging the seat latch to prevent folding movement of the seat frame from the unfolded position and applying the unfolding torque to the seat frame as the stroller frame is unfolded.

4. The folding mechanism of claim 3, wherein the trigger element is pivotally connected to the drive element, the trigger element having a cam follower distally disposed from the pivot, and a trigger cam connected to the first extension member for movement therewith, the trigger cam being configured with a trigger portion and a retracted portion which pivot the trigger element between the released and the locked positions corresponding to rotation of the drive element between the first and second positions, respectively, the second extension member further comprising a blocking structure connected adjacent to the drive element, the blocking structure configured to permit movement of the cam follower toward the first position for at least a portion of the movement of the second mounting structure in relation to the first extension member.

5. The folding mechanism of claim 4, wherein the blocking structure further comprises a driving end configured to engage the trigger element when the cam follower moves to the trigger portion of the cam, engagement of the driving end by the trigger element enabling the biasing element to drive the second extension in the second direction.

6. A folding mechanism for a collapsible stroller frame, the frame having a forwardly extending front support, a rearwardly extending rear support, an upwardly extending handle support, and a folding joint connecting respective proximal ends of the front, rear, and handle supports in a manner enabling folding movement thereof between opposing folded and unfolded configurations, the folding mechanism comprising:
   a foldable seat frame pivotally attached at connections to the front and rear supports spaced apart from the folding joint with folding pivot disposed between the leg connections, downward folding of the seat frame folding pivot corresponding to folding movement of the stroller frame;
   a frame release moveable between generally opposing lock and release positions;
   a seat latch operably positionable either to prevent movement of the seat frame folding pivot from the unfolded frame position or to permit such movement;
   a latching mechanism disposed on the rear support operably connected to the second extension distal end and configured for movement between generally opposing first and second positions, the latching mechanism having a moveable drive element, movement of which is managed by a trigger element, to selectively apply a folding torque to the second extension while blocking application of an unfolding torque on the second extension when the frame release actuator is moved to the unlatched position, and to apply the unfolding torque to the second extension as the stroller frame is unfolded; and
   a resilient member configured to selectively apply a biasing force on the seat frame urging it toward the unfolded position, the selective application of the biasing force being dependent upon the position of the latching mechanism and the degree of movement of the stroller frame between the folded and unfolded positions.

7. The folding mechanism of claim 6, wherein the drive element is configured for rotating movement about a pivot axis between generally opposing first and second positions and operably connected to the frame release actuator for movement thereby, the drive element rotated to the first position by movement of the frame release actuator to the release position, such movement of the drive element repositioning the seat latch to permit folding movement of the seat frame folding pivot, inhibiting application of the unfolding torque to the second member, and applying a folding torque to the second member, the drive element rotated to the second position by movement of the frame release actuator to the lock position, such movement of the drive element allowing the seat latch to be engaged to prevent folding movement of the seat frame from the unfolded position and allow the unfolding torque to be applied to the seat frame as the stroller frame is unfolded.

8. The folding mechanism of claim 7, wherein the trigger element is pivotally connected to the drive element, the trigger element having a cam follower distally disposed from the pivot, and a trigger cam connected to the first extension member for movement therewith, the trigger cam being configured with a trigger portion and a retracted portion which pivot the trigger element between the released and the locked positions corresponding to rotation of the drive element between the first and second positions, respectively, the second extension member further comprising a blocking structure connected adjacent to the drive element, the blocking structure configured to permit movement of the cam follower toward the first position for at least a portion of the movement of the second mounting structure in relation to the first extension member.

9. The folding mechanism of claim 8, wherein the blocking structure further comprises a driving end configured to engage the trigger element when the cam follower moves to the trigger portion of the cam, engagement of the driving end by the trigger element enabling the resilient member to drive the second extension in the second direction.

10. In a foldable stroller frame having a forward leg, a rearward leg, and a handle extension pivotally joined at a folding connector to enable the frame to be pivoted between folded and unfolded configurations, and a foldable seat frame pivotally attached at connections to the forward and rearward legs spaced apart from the folding connector with folding pivot disposed between the leg connections, downward folding of the seat frame folding pivot corresponding to folding movement of the stroller frame, the improvement in a folding mechanism for the frame comprising:
   a frame release moveable between generally opposing lock and release positions;
   a seat latch operably positionable to prevent movement of the seat frame folding pivot from the unfolded frame position or to permit such movement;
   a latching mechanism operably connected to the frame release and having a moveable drive element configured for rotating movement about a pivot axis between generally opposing first and second positions, rotating movement thereof managed by a trigger element;
   a resilient member configured to selectively apply a biasing force on the seat frame urging it toward the unfolded position, the selective application of the biasing force being dependent upon the position of the drive element; and
   a moveable locking mechanism operably connected to the drive element, the locking mechanism being moveable being generally opposing locked and released positions, movement of the drive element toward the first position causing movement of the locking mechanism toward the released position wherein the resilient member urges the seat frame in the first direction, movement of the locking mechanism toward the second position causing movement of the locking mechanism toward the locked position;
   the drive element rotated to the first position by movement of the frame release to the release position, movement of the drive element configured to reposition the seat latch to permit folding movement of the seat frame folding pivot, isolate the resilient member so that the biasing force is not applied to the seat frame, and apply a folding force to the seat frame;
   the drive element rotated to the second position by movement of the frame release to the lock position, movement of the drive element configured to allow the seat latch to be engaged to prevent folding movement of the seat frame from the unfolded position and permit the resilient member to apply the biasing force to the seat frame as the stroller frame is unfolded.

11. The improvement of claim 10, wherein the trigger element is pivotally connected to the drive element, the trigger element having a cam follower distally disposed from the pivot, and a trigger cam disposed on the first mounting structure, the trigger cam being configured with a trigger portion and a retracted portion which pivot the trigger element between the released and the locked positions corresponding to rotation of the drive element between the first and second positions, respectively, the second mounting structure further comprising a blocking structure disposed on the housing adjacent to the drive element, the blocking structure configured to permit movement of the cam follower toward the retracted portion for at least a portion of the movement of the second mounting structure in relation to the first mounting structure.

12. The improvement of claim 11, wherein the blocking structure further comprises a driving end configured to engage the trigger element when the cam follower moves to the trigger portion of the cam, engagement of the driving end by the trigger element enabling the biasing element to drive the seat frame in the first direction.

\* \* \* \* \*